United States Patent
Brasher et al.

(10) Patent No.: US 6,895,586 B1
(45) Date of Patent: May 17, 2005

(54) ENTERPRISE MANAGEMENT SYSTEM AND METHOD WHICH INCLUDES A COMMON ENTERPRISE-WIDE NAMESPACE AND PROTOTYPE-BASED HIERARCHICAL INHERITANCE

(75) Inventors: Michael Eugene Brasher, Missouri City, TX (US); Roger Glenn Huebner, Sugar Land, TX (US)

(73) Assignee: BMC Software, Houston, TX (US)

( * ) Notice: Subject to any disclaimer, the term of this patent is extended or adjusted under 35 U.S.C. 154(b) by 948 days.

(21) Appl. No.: 09/651,408

(22) Filed: Aug. 30, 2000

(51) Int. Cl.⁷ ............................................. G06F 15/16
(52) U.S. Cl. ....................... 719/313; 709/201; 709/223; 719/318
(58) Field of Search .................. 709/223, 224, 709/227, 202, 226, 214, 201, 203; 719/313–318

(56) References Cited

U.S. PATENT DOCUMENTS

| | | | | |
|---|---|---|---|---|
| 5,367,635 A | * | 11/1994 | Bauer et al. ............... 709/221 |
| 5,634,124 A | | 5/1997 | Khoyi et al. ............ 707/103 R |
| 5,655,081 A | * | 8/1997 | Bonnell et al. ............. 709/202 |
| 5,848,243 A | | 12/1998 | Kulkarni et al. ............ 719/224 |
| 5,859,978 A | * | 1/1999 | Sonderegger et al. ....... 709/226 |
| 5,878,415 A | * | 3/1999 | Olds .............................. 707/9 |
| 5,920,719 A | | 7/1999 | Sutton et al. ................ 717/130 |
| 5,978,594 A | * | 11/1999 | Bonnell et al. ............... 710/17 |
| 5,983,234 A | * | 11/1999 | Tietjen et al. ........... 707/103 R |
| 5,987,514 A | | 11/1999 | Rangarajan ................. 709/224 |
| 6,021,437 A | * | 2/2000 | Chen et al. .................. 709/224 |
| 6,052,724 A | | 4/2000 | Willie et al. ................ 370/223 |
| 6,137,777 A | | 10/2000 | Vaid et al. .................. 370/230 |
| 6,141,759 A | * | 10/2000 | Braddy ....................... 713/201 |
| 6,308,163 B1 | | 10/2001 | Du et al. ........................ 705/8 |
| 6,360,266 B1 | * | 3/2002 | Pettus ......................... 709/227 |
| 6,430,613 B1 | | 8/2002 | Brunet et al. ................ 709/223 |
| 6,501,491 B1 | * | 12/2002 | Brown et al. ................ 345/853 |
| 6,546,415 B1 | * | 4/2003 | Park ........................... 709/202 |
| 6,560,647 B1 | * | 5/2003 | Hafez et al. ................. 709/224 |
| 6,567,818 B1 | | 5/2003 | Frey et al. .............. 707/103 R |
| 6,651,062 B2 | | 11/2003 | Ghannam et al. ............. 707/10 |
| 2002/0059425 A1 | | 5/2002 | Belfiore et al. ............. 709/226 |
| 2002/0188584 A1 | | 12/2002 | Ghannam et al. .............. 707/1 |
| 2003/0033402 A1 | * | 2/2003 | Battat et al. ................ 709/224 |

* cited by examiner

*Primary Examiner*—Paul H. Kang
(74) *Attorney, Agent, or Firm*—Wong, Cabello, Lutsch, Rutherford & Brucculeri, LLP

(57) ABSTRACT

A system and method for providing an improved namespace and object description system for enterprise management are disclosed. The system and method employ a hierarchical namespace with objects including prototypes and instances where an instance inherits traits from a prototype, such as attribute values and/or child objects.

35 Claims, 13 Drawing Sheets

| Attribute | Access Code | Description |
|---|---|---|
| Name | CG | MM back-end name, "MM" by default. |
| Subagent Profile Name | CG | File name of the associated subagent profile. |

FIG. 11

| Attribute | AccessCode | Description |
|---|---|---|
| Name | CG | Name of subagent. In one embodiment, it is the key to resolving actual connection information such as host name, port number, and transport protocol. |
| Connection State | CG | Connection status. Possible values may include CONNECTED, DISCONNECTED, CONNECT INPROGRESS, DISCONNECT IN PROGRESS, and BROKEN. |
| User ID | CGS | User name used to obtain the access token for COSP mount operation. |
| Polling Time | CGS | Timer in seconds to poll the subagent and try to establish connection with the subagent. |
| Included KM Packages | CG | Vector of strings giving the list of included KM packages. |
| Excluded KM Packages | CG | Vector of strings giving the list of excluded KM packages. |
| Effective KM Packages | CG | Vector of strings giving the list of effective KM packages. |

FIG. 13

| Field Name | Position | Type | Description |
|---|---|---|---|
| Subagent Name | 0 | String | Name of the subagent. In one embodiment, it is the key to resolving actual connection information such as host name, port number, and transport protocol. |
| Flags | 1 | Unsigned 32 bit integer | 32 bits flags. Bits may be indexed from least significant bit to most significant but starting from 0 to 31. Bit 0 may be used as the "connect" flag. If bit 0 is set, the connection to the subagent may be established when the subagent is loaded. Other bits may be reserved for future use. In specifying this flag, decimal, octal, and hexadecimal number, the C language format may be used. |
| User ID | 2 | String | User name used to obtain the access token for Common Object System Protocol (COSP) mount operation. |
| Polling Time | 3 | Unsigned 32 bit integer | Timer in seconds to poll the subagent and try to establish connection with the subagent. |
| Included KM Packages | 4 | String | Comma separated list of KM packages that are of interest. Alternatively, a single "*" may be used to denote that all KM packages available in the subagent but those specified in "excluded KM packages" are of interest. |
| Excluded KM Packages | 5 | String | Comma separated list of KM packages that are not of interest. Alternatively, a single "*" may be used to denote that all KM packages available in the subagent but those specified in "included KM packages" are not of interest. |

FIG. 12

| Included KM Packages | Excluded KM Packages | Effective KM Packages |
|---|---|---|
| "*" | "*" | Null |
| "*" | Vector of strings giving the list of excluded KM packages | All KM packages available in the subagent but those in the excluding list. |
| Vector of strings giving the list of included KM packages | "*" | KM packages that are in the including list. |
| Vector of strings giving the list of included KM packages | Vector of strings giving the list of excluded KM packages | KM packages that are in the including list but not in the excluding list. |

FIG. 14

| Editing Top-level Object in KM IDE | "KM_ModifyEvent" Event Target in Subagent |
|---|---|
| KM Package object | /KM, i.e., the root of KM back-end. |
| Application type | The corresponding KM package object |
| Parameter | The corresponding parent application type |
| Menu Command | The corresponding parent application type, parameter, etc. |

FIG. 16

| Event Class | Source Object | When | Description |
|---|---|---|---|
| Cos_CreateEvent | MM Back-end | mmManager Object | After an "mmProxy" object is created. | Notify other back-ends of existence of the new "mmProxy" object. |
| Cos_DestroyEvent | MM Back-end | mmManager Object | Before an "mmProxy" object is destroyed. | Clients can carry out clean up basing on this event. |
| Cos_SetEvent on "connection state" attribute | MM Back-end | mmProxy Object | After "connection state" attribute is modified. | This event provides information about connect state change of an "mmProxy" object. |
| Cos_SetEvent on "included KM packages" attribute | MM Back-end | mmProxy Object | After the attribute is modified. | This event provides information about KM packages that are included. |
| Cos_SetEvent on "excluded KM packages" attribute | MM Back-end | mmProxy Object | After the attribute is modified. | This event provides information about KM packages that are excluded. |
| Cos_SetEvent on "effective KM packages" | MM Back-end | mmProxy Object | After the attribute is modified. | This event provides information about KM packages that are effective. |

FIG. 15

ENTERPRISE MANAGEMENT SYSTEM AND METHOD WHICH INCLUDES A COMMON ENTERPRISE-WIDE NAMESPACE AND PROTOTYPE-BASED HIERARCHICAL INHERITANCE

BACKGROUND OF THE INVENTION

1. Field of the Invention

The present invention relates to computer software, and more particularly to agent-based management of a distributed or enterprise computer system.

2. Description of the Related Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise. As used herein, an "enterprise" refers to a network comprising one or more computer systems. Managers of an enterprise often employ software packages known as enterprise management systems to monitor, analyze, and manage the resources of the enterprise. For example, an enterprise management system might include a software agent on an individual computer system for the monitoring of particular resources such as CPU usage or disk access. As used herein, an "agent," "agent application," or "software agent" is a computer program that is configured to monitor and/or manage the hardware and/or software resources of one or more computer systems. U.S. Pat. No. 5,655,081 discloses one example of an agent-based enterprise management system.

With data widely distributed over the many individual computer systems that comprise the enterprise, it is advantageous for the data to be organized and accessible throughout the enterprise. For example, in monitoring individual computer systems, software agents may generate and store data related to the monitoring. This data is often referred to as metric data. Metrics may include, for example, measurements relating to CPU usage, network usage, or memory usage. Other agents or applications on the same or other computer systems may desire to access this metric data. For example, a console application may desire to access the metrics from individual, monitored computer systems in order to graph or analyze potential bottlenecks in a network which links together the computer systems.

An enterprise-wide namespace is one way to make data available throughout an enterprise. A namespace provides efficient referencing and retrieval of information. The term "namespace" generally refers to a set of names in which all names are unique. As used herein, a "namespace" may refer to a memory, or a plurality of memories which are coupled to one another, whose contents are uniquely addressable. "Uniquely addressable" refers to the property that items in a namespace have unique names such that any item in the namespace has a name different from the names of all other items in the namespace.

The internet is one example of a namespace. The internet comprises many individual computer systems which are linked together through an addressing system which guarantees that every server name is different from every other server name. The internet achieves the property of unique addressability through the use of a hierarchical name structure. For example, the top level of the hierarchy includes a limited number of high-level domain suffixes such as ".com", ".edu", and ".org". Within a high-level suffix such as ".com" are many domains such as, for example, "bmc.com". The domain administrator of "bmc.com" has the ability to designate lower levels of the hierarchy, such as division names, subdivision names, site names, server names, and so on. For example, the unique name of an individual server may take a form such as "computer.site.division.bmc.com" or "computer.site.subdivision.division.bmc.com". This hierarchy helps ensure that each server has a unique name within the namespace.

A namespace is typically a logical organization and not a physical one. The namespace of the internet, for instance, is not related to physical interconnections. For instance, "server1.bmc.com" and "server2.bmc.com" could be physically located in the same room, in different countries, or anywhere in between. In other words, a namespace may be thought of as a plurality of distinct physical memories which are organized as a single, and possibly distributed, logical memory.

A directory service is another way of making data available throughout an enterprise. Typically, a directory service is a network service that identifies all resources on a network and makes them accessible to users and applications. Resources often include e-mail addresses, computers, and peripheral devices such as printers. Ideally, the directory service should make the physical network topology and protocols transparent so that a user on a network can access any resource without knowing where or how it is physically connected. A directory service is similar to a database in that it contains entries.

A directory service may be implemented in many different ways. For example, different implementations may allow different kinds of information to be stored in the directory. Often, entries may contain descriptive information relating to attributes of the resources. Different implementations may also place different requirements on how that information can be referenced, queried, updated, and protected from unauthorized access. Some directory services are local: they provide data only within a restricted context. For example, the "finger" service which returns information on user accounts may be operable only on a particular network or machine. Other services are global: they provide data within a much broader context such as the entire internet. Global services such as those found on the internet are usually distributed. In other words, the data they contain is spread across many machines, all of which cooperate to provide the directory service. Typically, a global directory service defines a namespace which gives the same view of the data regardless of the location of the requesting machine or software relative to the data itself.

The Lightweight Directory Access Protocol (LDAP) is one example of a directory service. LDAP is both an information model and a protocol for querying and manipulating the information. The LDAP directory service model is based on entries. An entry is a collection of attributes having an unambiguous or unique name and often relating to information such as e-mail addresses and public encryption keys. LDAP's overall data and namespace model is essentially that of the more complex X.500 standard, and LDAP is also a set of protocols for accessing X.500 information directories. The X.500 standard defines basic object classes and a global, hierarchical directory structure. X.500 may be used to define a directory web in much the same way that the Hypertext Transport Protocol (HTTP) and Hypertext Markup Language (HTML) standards are used to define and implement the World Wide Web. Anyone with an X.500 or LDAP client may peruse the global directory just as they may use a web browser to peruse the global Web. Fundamentally, therefore, LDAP is a method for accessing information from a variety of directories, as long as vendors have implemented LDAP support in their directories. However, LDAP does not provide advanced features such as associations or the inheritance of attribute values and children from another entry in the namespace.

Another approach towards organizing information in an enterprise is taken by the Web-Based Enterprise Management (WBEM) initiative, managed by the Desktop Management Task Force (DMTF). The WBEM initiative is intended to prescribe enterprise management standards. One WBEM standard, the Common Information Model (CIM), is a platform-independent, object-oriented information model which allows for the interchange of management information between management systems and applications. CIM offers a single data-description mechanism for enterprise data sources from multiple vendors and frameworks. CIM provides a Meta Schema and a Schema. The CIM Meta Schema is a formal definition of the information model: it defines the terms used to express the model and the usage and semantics of the terms. The CIM Meta Schema also supports associations as types of classes. The CIM Schema provides the actual model descriptions. In other words, the CIM Schema supplies a set of classes with properties and associations that provide a conceptual framework for organizing the available information about a managed environment in an enterprise. Nevertheless, the Common Information Model merely provides the basic functionality to allow products from different vendors to exchange management data with one another; vendors must usually provide extensions to CIM in order to support product development. Furthermore, CIM does not specify how to implement its data description model in an enterprise-wide namespace.

For the foregoing reasons, there is a need for a system and method for an improved namespace and object description system for enterprise management.

SUMMARY OF THE INVENTION

The present invention provides various embodiments of a system and method for an improved namespace for an enterprise management system. In one embodiment, the system and method are used in a distributed computing environment, i.e., an enterprise. The enterprise comprises a plurality of computer systems, or nodes, which are interconnected through a network. At least one of the computer systems is a monitor computer system from which a user may monitor the nodes of the enterprise. At least one of the computer systems is an agent computer system. An agent computer system includes agent software that permits the collection of data relating to one or more metrics, i.e., measurements of system resources on the agent computer system. The agent software may comprise an agent application which is configurable to monitor the software and hardware of a computer system. The agent software may comprise one or more knowledge modules which are configurable to monitor or capture data from one or more of the computer systems and/or their subsystems.

In one embodiment, a hierarchical namespace may be provided or created. The namespace comprises a logical arrangement of the objects, stored hierarchically. A plurality of objects may be added to the namespace, wherein the objects relate to software and hardware of the one or more computer systems. The plurality of objects may be distributed across the one or more networked computer systems of the enterprise. The plurality of objects may be shared with a plurality of the one or more computer systems. Consequently, data and/or events may be shared with the one or more computer systems. The namespace and its objects (e.g., data and events) may be shared with the one or more computer systems of the enterprise by allowing the computer systems to mount both local and remote objects.

In one embodiment, at least one of the objects is a prototype and at least one of the objects is an instance. The instance inherits from the prototype traits such as attribute values and/or child objects.

In one embodiment, one or more events in the hierarchical namespace may published. Each event may comprises an operation performed on one or more of a plurality of objects stored in the hierarchical namespace. One or more of the published events may be subscribed to. In subscribing to one or more of the published events, a criterion may be designated, and the published events which match the criterion may be subscribed to. In subscribing to one or more of the published events, a branch of the hierarchical namespace may be designated, and the published events which occur within the designated branch may be subscribed to.

In one embodiment, an association may be designated, wherein the association specifies a relationship between two or more of the objects. Each association may comprise an association object, wherein each association object comprises two or more attributes, wherein the two or more attributes comprise pathnames of the two or more objects whose relationship is specified in the association.

In one embodiment, one or more schemas may be designated, wherein each schema is a template which specifies one or more valid traits for a type of object. Each of the plurality of objects may follow at least one of the one or more schemas. Each object may include an identifier which indicates a type of the object, wherein the type of the object indicates one of the one or more schemas to be followed by the object. The schemas may be configured to support dynamic type checking of operations performed on the objects.

An application programming interface for managing the enterprise may be provided. In various embodiments, the application programming interface may enable applications such as agent applications to perform a variety of functions. The application programming interface may enable a first application to share a plurality of objects stored in a hierarchical namespace with a plurality of other applications. The application programming interface may enable the first application to designate a prototype, wherein the prototype is one of the plurality of objects. The application programming interface may enable the first application to designate an instance, wherein the instance is one of the plurality of objects, and wherein the instance inherits traits from the prototype. The application programming interface may enable the first application to publish one or more events, wherein each event comprises an operation performed on one or more of the plurality of objects. The application programming interface may enable the first application to subscribe to one or more of the published events. The application programming interface may enable the first application to designate an association, wherein the association specifies a relationship between two or more of the objects. The application programming interface may enable the first application to designate one or more schemas, wherein each schema is a template which specifies one or more valid traits for a type of object.

In various embodiments, the improved namespace for enterprise management may include the use of mid-level managers for scalability and flexibility. In one embodiment, a plurality of agents may be mounted, wherein the agents are configurable to gather a first set of information relating to a plurality of managed computer systems. The gathered information may comprise, for example, events and status information. The first set of gathered information may be received from the plurality of agents, pooled in a first mid-level manager namespace of a first mid-level manager, and presented in the first mid-level manager namespace to a management console. The first set of gathered information may be filtered by the first mid-level manager prior to presenting the first set of gathered information in the first mid-level manager namespace to the management console. The first set of information gathered by the agents may comprises individual events generated from the managed computer systems. Composite events, each comprising a plurality of the individual events, may be generated and presented in the first mid-level manager namespace to the management console. Correlated events, each comprising a correlation among a plurality of the individual events, may be generated and presented in the first mid-level manager namespace to the management console.

In one embodiment, additional mid-level managers may be used in multiple, hierarchical tiers. Presenting the first set of gathered information in the first mid-level manager namespace to the management console may comprise presenting the first set of gathered information in the first mid-level manager namespace to a higher-level mid-level manager, pooling the first set of gathered information in a higher-level mid-level manager namespace, and presenting the first set of gathered information in the higher-level mid-level manager namespace to the management console.

In one embodiment, additional mid-level managers may be used in the same tier as the first mid-level manager. A second set of gathered information may be gathered by and received from the plurality of agents. The second set of gathered information may be pooled in a second mid-level manager namespace of a second mid-level manager and presented in the second mid-level manager namespace to a management console. The first set and second set of gathered information may be received by the higher-level mid-level manager from the first mid-level manager and second mid-level manager, pooled in the higher-level mid-level manager namespace, and presenting the first set of gathered information in the higher-level mid-level manager namespace to the management console. The first mid-level manager namespace and the second mid-level manager namespace may comprise configuration information for the plurality of agents, such that the configuration information is stored and maintained in a distributed fashion.

BRIEF DESCRIPTION OF THE DRAWINGS

A better understanding of the present invention can be obtained when the following detailed description of several embodiments is considered in conjunction with the following drawings, in which:

FIG. 11 is a table illustrating attributes and values for a mid-level manager object according to one embodiment;

FIG. 12 is a table illustrating fields and values for a subagent profile according to one embodiment;

FIG. 13 is a table illustrating attributes and values for a mid-level manager proxy object according to one embodiment;

FIG. 14 is a table illustrating package management by mid-level manager proxy objects according to one embodiment;

FIG. 15 is a table illustrating events used by the mid-level manager back-end according to one embodiment;

FIG. 16 is a table illustrating KM object synchronization in KM development according to one embodiment.

Figure 1:
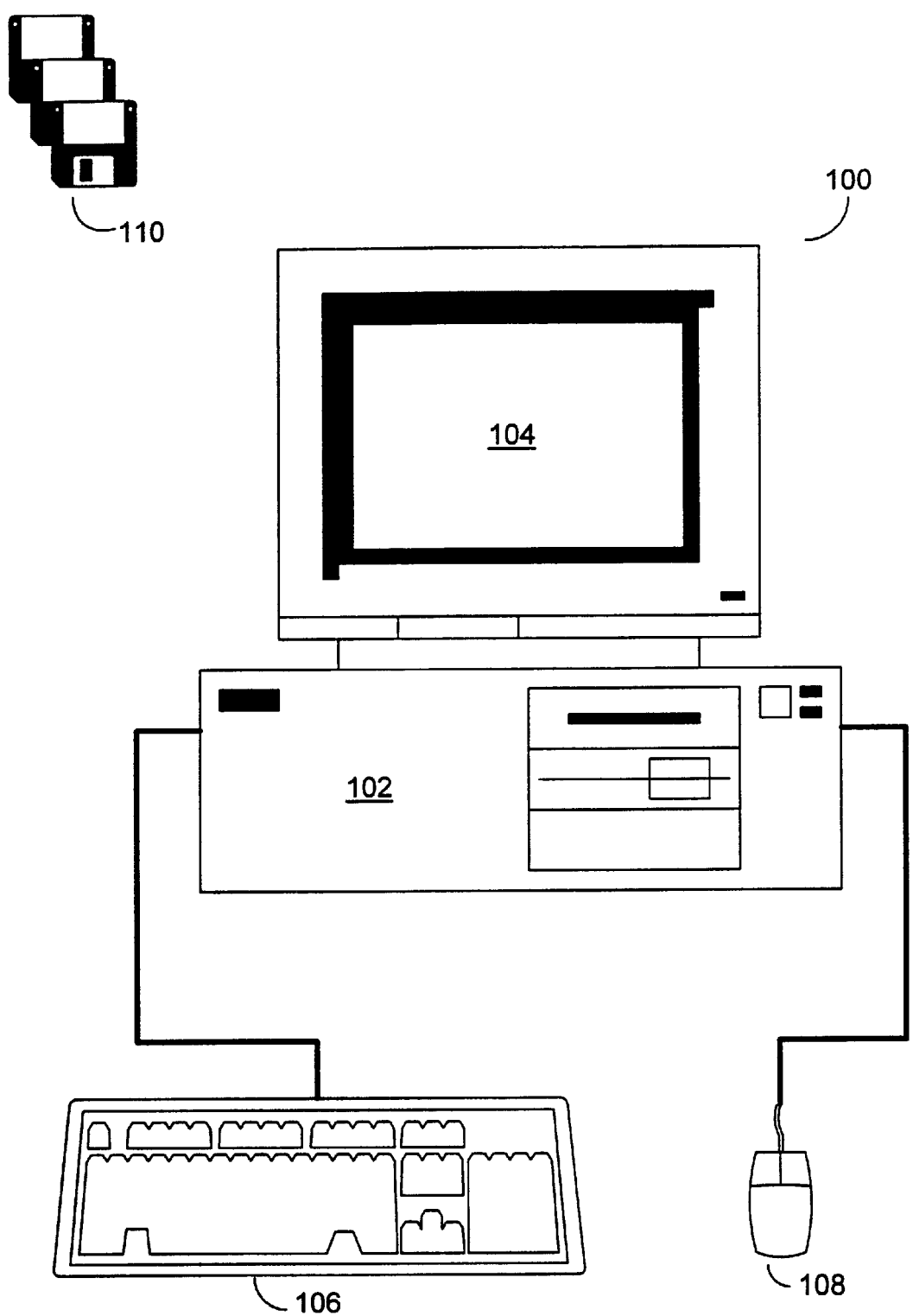
FIG. 1 illustrates a computer system which is suitable for implementing an improved enterprise management system and method according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1—A Typical Computer System

FIG. 1 illustrates a typical, general-purpose computer system 100 which is suitable for implementing an improved enterprise management system and method according to one embodiment. The computer system 100 typically comprises components such as computing hardware 102, a display device such as a monitor 104, an alphanumeric input device such as a keyboard 106, and optionally an input device such as a mouse 108. The computer system 100 is operable to execute computer programs which may be stored on disks 110 or in computing hardware 102. In one embodiment, the disks 110 comprise an installation medium. In various embodiments, the computer system 100 may comprise a desktop computer, a laptop computer, a palmtop computer, a network computer, a personal digital assistant (PDA), an embedded device, a smart phone, or any other suitable computing device.

Figure 2:
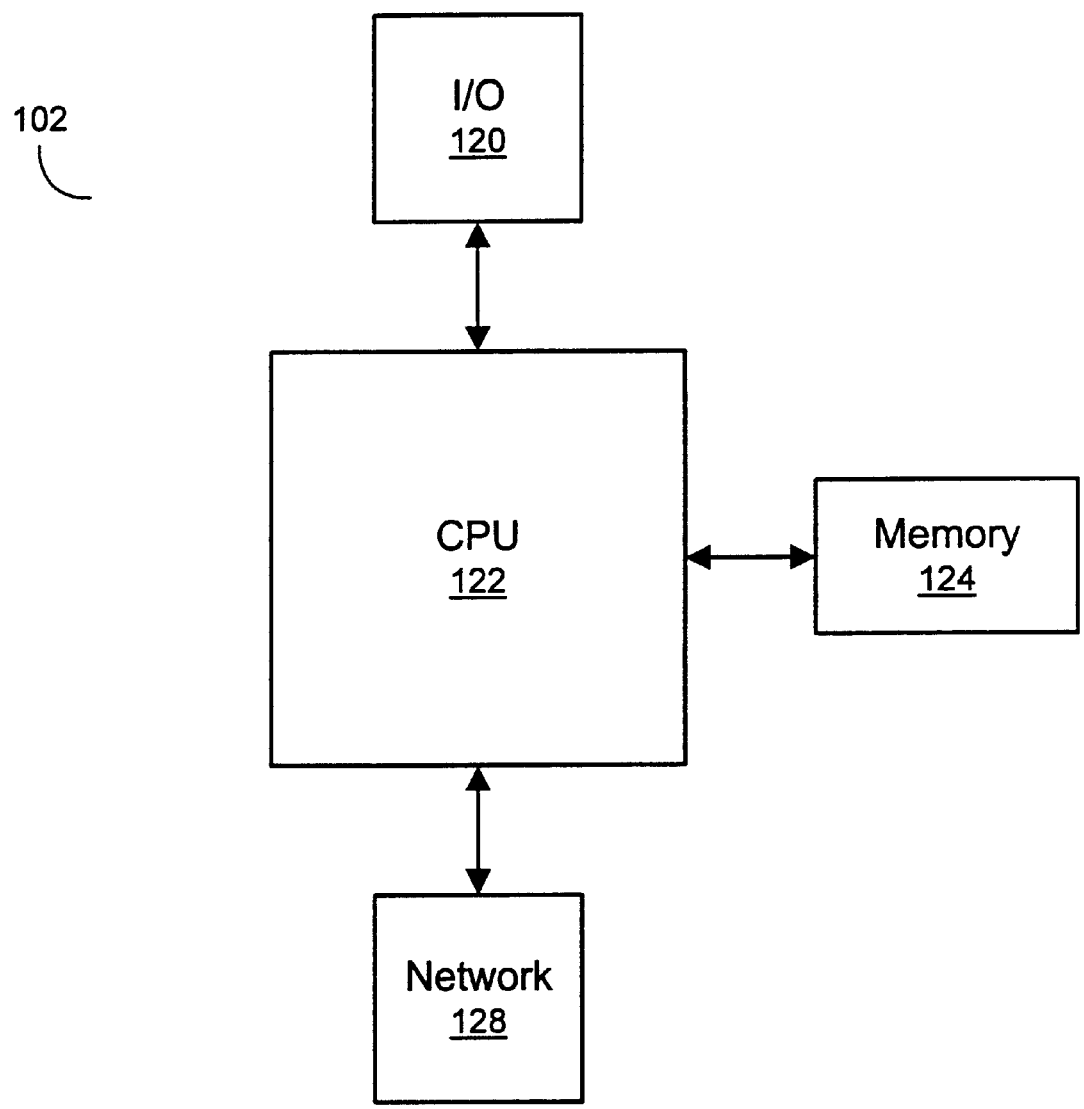
FIG. 2 further illustrates a computer system which is suitable for implementing an improved enterprise management system and method according to one embodiment.

FIG. 2—Computing Hardware of a Typical Computer System

FIG. 2 is a block diagram illustrating the computing hardware 102 of a typical, general-purpose computer system 100 which is suitable for implementing an improved enterprise management system and method according to one embodiment. The computing hardware 102 includes at least one central processing unit (CPU) or other processor(s) 122. The CPU 122 is configured to execute program instructions which implement the improved enterprise management system and method as described herein. The CPU 122 is preferably coupled to a memory medium 124.

As used herein, the term "memory medium" includes a non-volatile medium, e.g., a magnetic medium, hard disk, or optical storage; a volatile medium, such as computer system memory, e.g., random access memory (RAM) such as DRAM, SDRAM, SRAM, EDO RAM, Rambus RAM, etc.; or an installation medium, such as CD-ROM, floppy disks, or a removable disk, on which computer programs are stored for loading into the computer system. The term "memory medium" may also include other types of memory and is used synonymously with "memory." The memory medium 124 may therefore store program instructions and/or data which implement the improved enterprise management system and method described herein. Furthermore, the memory medium 124 may be utilized to install the program instructions and/or data. In a further embodiment, the memory medium 124 may be comprised in a second computer system which is coupled to the computer system 100 through a network 128. In this instance, the second computer system may operate to provide the program instructions stored in the memory medium 124 through the network 128 to the computer system 100 for execution.

The CPU 122 may also be coupled through an input/output bus 120 to one or more input/output devices that may include, but are not limited to, a display device such as a monitor 104, a pointing device such as a mouse 108, a keyboard 106, a track ball, a microphone, a touch-sensitive display, a magnetic or paper tape reader, a tablet, a stylus, a voice recognizer, a handwriting recognizer, a printer, a plotter, a scanner, and any other devices for input and/or output. The computer system 100 may acquire program instructions and/or data for implementing the improved enterprise management system and method as described herein through the input/output bus 120.

The CPU 122 may include a network interface device 128 for coupling to a network. The network may be representative of various types of possible networks: for example, a local area network (LAN), wide area network (WAN), or the Internet. The improved enterprise management system and method as described herein may therefore be implemented on a plurality of heterogeneous or homogeneous networked computer systems such as computer system 100 through one or more networks. Each computer system 100 may acquire program instructions and/or data for implementing the improved enterprise management system and method as described herein over the network.

Figure 3:
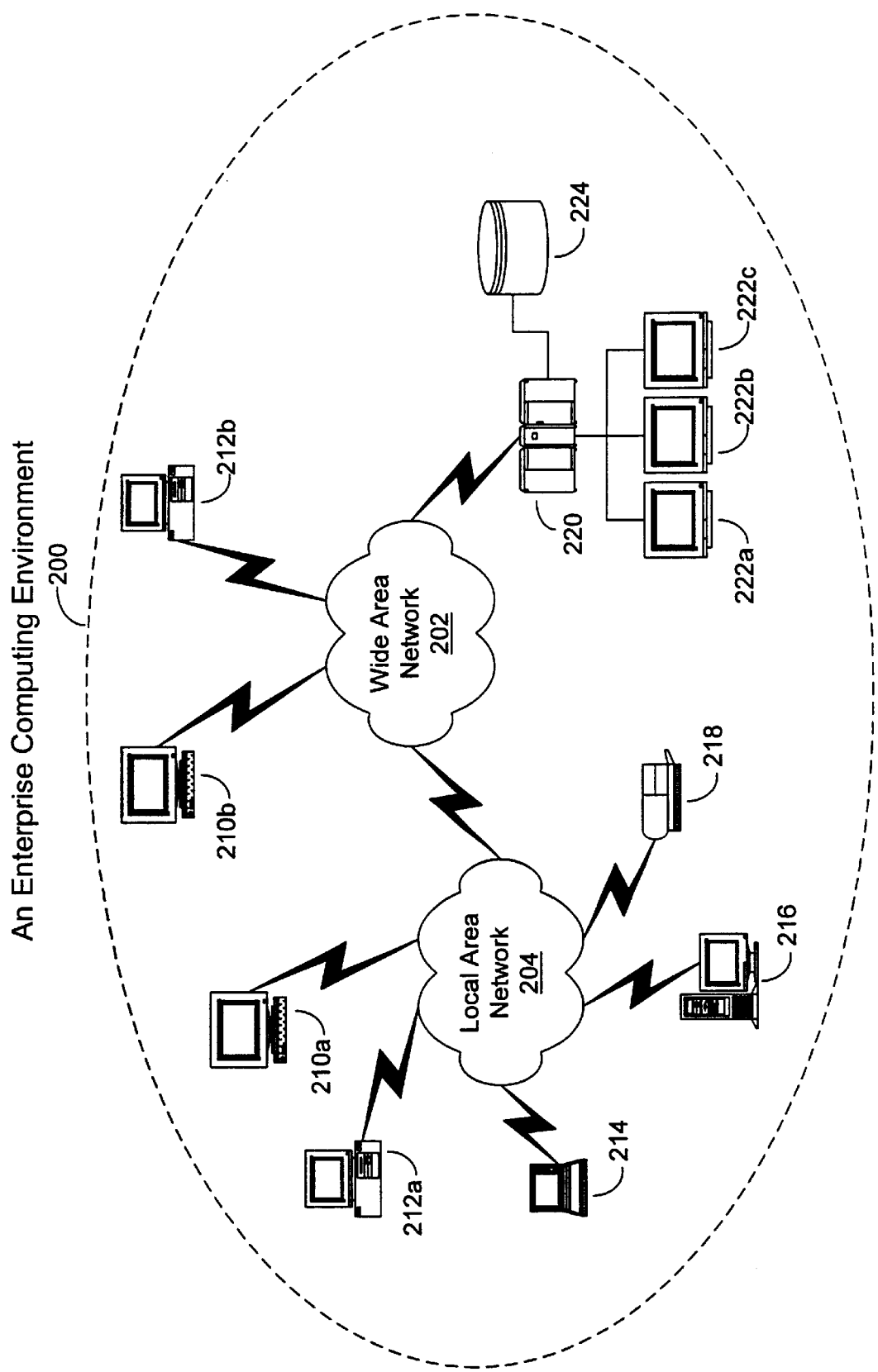
FIG. 3 illustrates an enterprise computing environment which is suitable for implementing an improved enterprise management system and method according to one embodiment.

FIG. 3—A Typical Enterprise Computing Environment

FIG. 3 illustrates an enterprise computing environment 200 according to one embodiment. An enterprise 200 comprises a plurality of computer systems such as computer system 100 which are interconnected through one or more networks. Although one particular embodiment is shown in FIG. 3, the enterprise 200 may comprise a variety of heterogeneous computer systems and networks which are interconnected in a variety of ways and which run a variety of software applications.

One or more local area networks (LANs) 204 may be included in the enterprise 200. A LAN 204 is a network that spans a relatively small area. Typically, a LAN 204 is confined to a single building or group of buildings. Each node (i.e., individual computer system or device) on a LAN 204 preferably has its own CPU with which it executes computer programs, and often each node is also able to access data and devices anywhere on the LAN 204. The LAN 204 thus allows many users to share devices (e.g., printers) as well as data stored on file servers. The LAN 204 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). FIG. 3 illustrates an enterprise 200 including one LAN 204. However, the enterprise 200 may include a plurality of LANs 204 which are coupled to one another through a wide area network (WAN) 202. A WAN 202 is a network that spans a relatively large geographical area.

Each LAN 204 comprises a plurality of interconnected computer systems or at least one computer system and at least one other device. Computer systems and devices which may be interconnected through the LAN 204 may include, for example, one or more of a workstation 210a, a personal computer 212a, a laptop or notebook computer system 214, a server computer system 216, or a network printer 218. An example LAN 204 illustrated in FIG. 3 comprises one of each of these computer systems 210a, 212a, 214, and 216 and one printer 218. Each of the computer systems 210a, 212a, 214, and 216 is preferably an example of the typical computer system 100 as illustrated in FIGS. 1 and 2. The LAN 204 may be coupled to other computer systems and/or other devices and/or other LANs 204 through a WAN 202.

A mainframe computer system 220 may optionally be coupled to the enterprise 200. As shown in FIG. 3, the mainframe 220 is coupled to the enterprise 200 through the WAN 202, but alternatively the mainframe 220 may be coupled to the enterprise 200 through a LAN 204. As shown in FIG. 3, the mainframe 220 is coupled to a storage device or file server 224 and mainframe terminals 222a, 222b, and 222c. The mainframe terminals 222a, 222b, and 222c access data stored in the storage device or file server 224 coupled to or comprised in the mainframe computer system 220.

The enterprise 200 may also comprise one or more computer systems which are connected to the enterprise 200 through the WAN 202: as illustrated, a workstation 210b and a personal computer 212b. In other words, the enterprise 200 may optionally include one or more computer systems which are not coupled to the enterprise 200 through a LAN 204. For example, the enterprise 200 may include computer systems which are geographically remote and connected to the enterprise 200 through the Internet.

When the computer programs 110 are executed on one or more computer systems such as computer system 100, an enterprise management system may be operable to monitor, analyze, and/or manage the computer programs, processes, and resources of the enterprise 200. Typically, each computer system 100 in the enterprise 200 executes or runs a plurality of software applications or processes. Each software application or process consumes a portion of the resources of a computer system and/or network: for example, CPU time, system memory such as RAM, non-volatile memory such as a hard disk, network bandwidth, and input/output (I/O). The enterprise management system and method of one embodiment permits users to monitor, analyze, and manage resource usage on heterogeneous computer systems 100 across the enterprise 200.

U.S. Pat. No. 5,655,081, titled "System for Monitoring and Managing Computer Resources and Applications Across a Distributed Environment Using an Intelligent Autonomous Agent Architecture," which discloses an enterprise management system and method, is hereby incorporated by reference as though fully and completely set forth herein.

Figure 4:
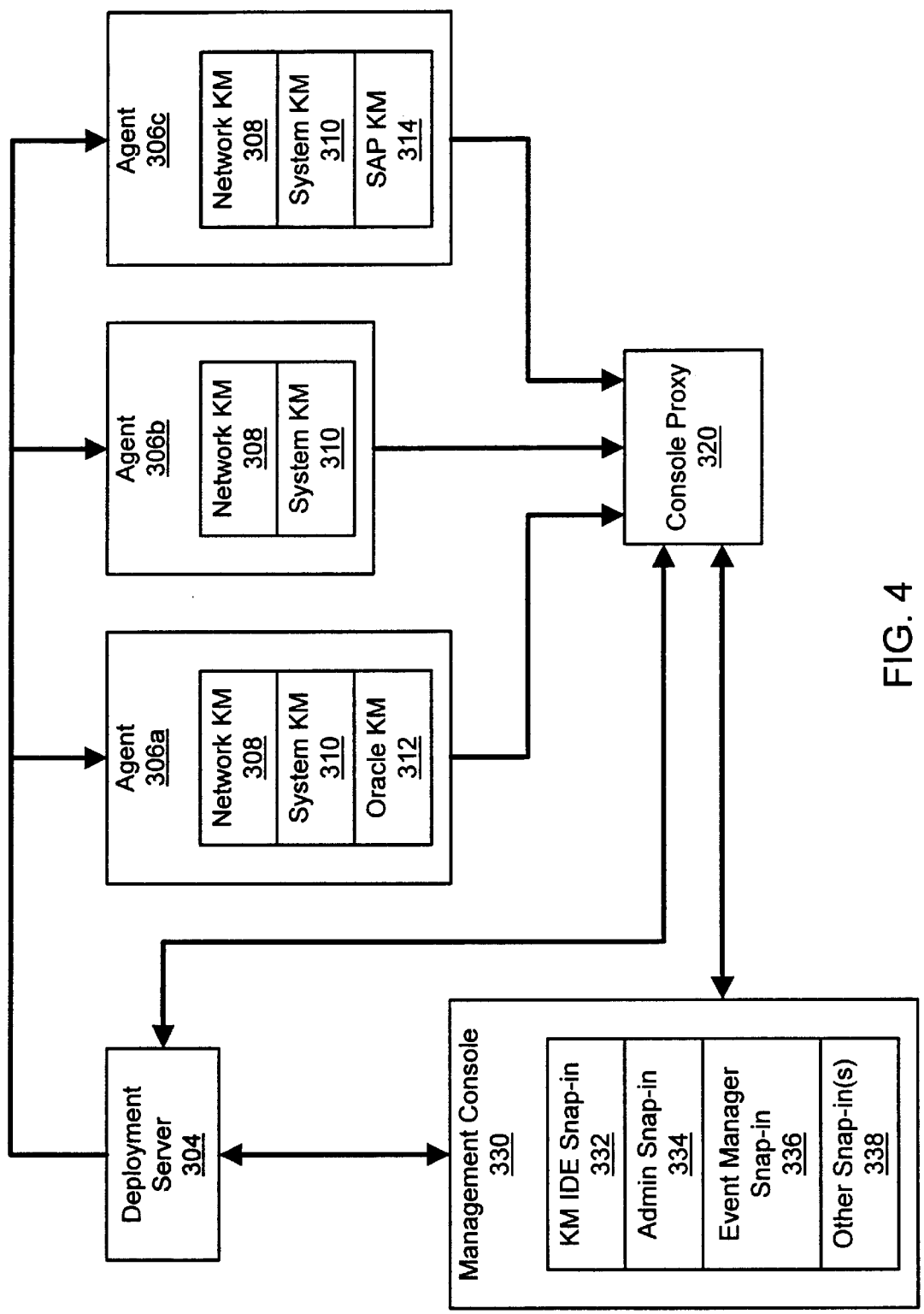
FIG. 4 is a block diagram which illustrates an overview of the improved enterprise management system and method according to one embodiment.

FIG. 4—Overview of the Enterprise Management System

FIG. 4 illustrates an overview of software components that may comprise the enterprise management system. In one embodiment, a management console 330, a deployment server 304, a console proxy 320, and agents 306a–306c may reside on different computer systems, respectively. In other embodiments, various combinations of the management console 330, the deployment server 304, the console proxy 320, and the agents 306a–306c may reside on the same computer system.

In one embodiment, the improved enterprise management system provides the sharing of data and events, both runtime and stored, across the enterprise. Data and events may comprise objects. As used herein, an object is a self-contained entity that contains data and/or procedures to manipulate the data. Objects may be stored in a volatile memory and/or a nonvolatile memory. The objects are typically related to the monitoring and analysis activities of the enterprise management system, and therefore the objects may relate to the software and/or hardware of one or more computer systems in the enterprise. A common object system (COS) may provide a common infrastructure for managing and sharing these objects across multiple agents. As used herein, "sharing objects" may include making objects accessible to one or more applications and/or computer systems and/or sending objects to one or more applications and/or computer systems.

A common object system protocol (COSP) may provide a communications protocol between objects in the enterprise. In one embodiment, a common message layer (CML) provides a common communication interface for components. CML may support standards such as TCP/IP, SNA, FTP, and DCOM. The deployment server 304 may use CML and/or the Lightweight Directory Access Protocol (LDAP) to communicate with the management console 330, the console proxy 320, and the agents 306a, 306b, and 306c.

A management console 330 is a software program that allows a user to monitor and/or manage individual computer systems in the enterprise 200. In one embodiment, the management console 330 is implemented in accordance with an industry-standard framework for management consoles such as the Microsoft Management Console (MMC) framework. MMC does not itself provide any management behavior. Rather, MMC provides a common environment or framework for snap-ins. As used herein, a "snap-in" is a module that provides management functionality. MMC has the ability to host any number of different snap-ins. Multiple snap-ins can be combined to build a custom management tool. Snap-ins allow a system administrator to extend and customize the console to meet specific management objectives. MMC provides the architecture for component integration and allows independently developed snap-ins to extend one another. MMC also provides programmatic interfaces. The MMC programmatic interfaces permit the snap-ins to integrate with the console. In other words, snap-ins are created by developers in accordance with the programmatic interfaces specified by MMC. The interfaces do not dictate how the snap-ins perform tasks, but rather how the snap-ins interact with the console.

In one embodiment, the management console is further implemented using a superset of MMC such as the BMC Management Console (BMCMC), also referred to as the BMC Integrated Console or BMC Integration Console (BMCIC). In one embodiment, BMCMC is an expansion of MMC: in other words, BMCMC implements all the interfaces of MMC, plus additional interfaces or other elements for additional functionality. Therefore, snap-ins developed for MMC will typically function with BMCMC in much the same way that they function with MMC. In other embodiments, the management console is implemented using any other suitable standard.

As shown in FIG. 4, in one embodiment the management console 330 may include several snap-ins: a knowledge module (KM) IDE snap-in 332, an administrative snap-in 334, an event manager snap-in 336, and optionally other snap-ins 338. The KM IDE snap-in 332 may be used for building new KMs and modifying existing KMs. The administrative snap-in 334 may be used to define user groups, user roles, and user rights and also to deploy KMs and other configuration files needed by agents and consoles. The event manager snap-in 336 may receive and display events based on user-defined filters and may support operations such as event acknowledgement. The event manager snap-in 336 may also support root cause and impact analysis. The other snap-ins 338 may include snap-ins such as a production snap-in for monitoring runtime objects and a correlation snap-in for defining the relationship of objects for correlation purposes. The snap-ins shown in FIG. 4 are shown for purposes of illustration and example: in various embodiments, the management console 330 may include different combinations of snap-ins, including snap-ins shown in FIG. 4 and snap-ins not shown in FIG. 4.

In various embodiments, the management console 330 may provide several functions. The console 330 may provide information relating to monitoring and may alert the user when critical conditions defined by a KM are met. The console 330 may allow an authorized user to browse and investigate objects that represent the monitored environment. The console 330 may allow an authorized user to issue and run application-management commands. The console 330 may allow an authorized user to browse events and historical data. The console 330 may provide a programmable environment for an authorized user to automate day-to-day tasks such as generating reports and performing particular system investigations. The console 330 may provide an infrastructure for running knowledge modules that are configured to create predefined views.

As used herein, an "agent," "agent application," or "software agent" is a computer program that is configured to monitor and/or manage the hardware and/or software resources of one or more computer systems. As illustrated in the example of FIG. 4, agents 306a, 306b, and 306c may have various combinations of several knowledge modules: network KM 308, system KM 310, Oracle KM 312, and SAP KM 314. As used herein, a "knowledge module" ("KM") is a software component that is configured to monitor a particular system or subsystem of a computer system, network, or other resource. A KM may generate an alarm at the console 330 when a user-defined condition is met. Network KM 308 may monitor network activity. System KM 310 many monitor an operating system and/or system hardware. Oracle KM 312 may monitor an Oracle relational database management system (RDBMS). SAP KM 314 may monitor an SAP R/3 system. Knowledge modules 308, 310, 312, and 314 are shown for exemplary purposes only, and in various embodiments other knowledge modules may be employed in an agent.

In one embodiment, a deployment server 304 may provide centralized deployment of software packages across the enterprise. The deployment server 304 may maintain product configuration data, provide the locations of products in the enterprise 200, maintains installation and deployment logs, and store security policies. In one embodiment, the deployment server 304 may provide data models based on a generic directory service such as the Lightweight Directory Access Protocol (LDAP).

In one embodiment, the management console 330 may access agent information through a console proxy 320. The console 330 may go through a console application programming interface (API) to send and receive objects and other data to and from the console proxy 320. The console API may be a Common Object Model (COM) API, a Common Object System (COS) API, or any other suitable API. In one embodiment, the console proxy 320 is an agent. Therefore, the console proxy 320 may have the ability to load, interpret, and execute knowledge modules.

Figure 5:
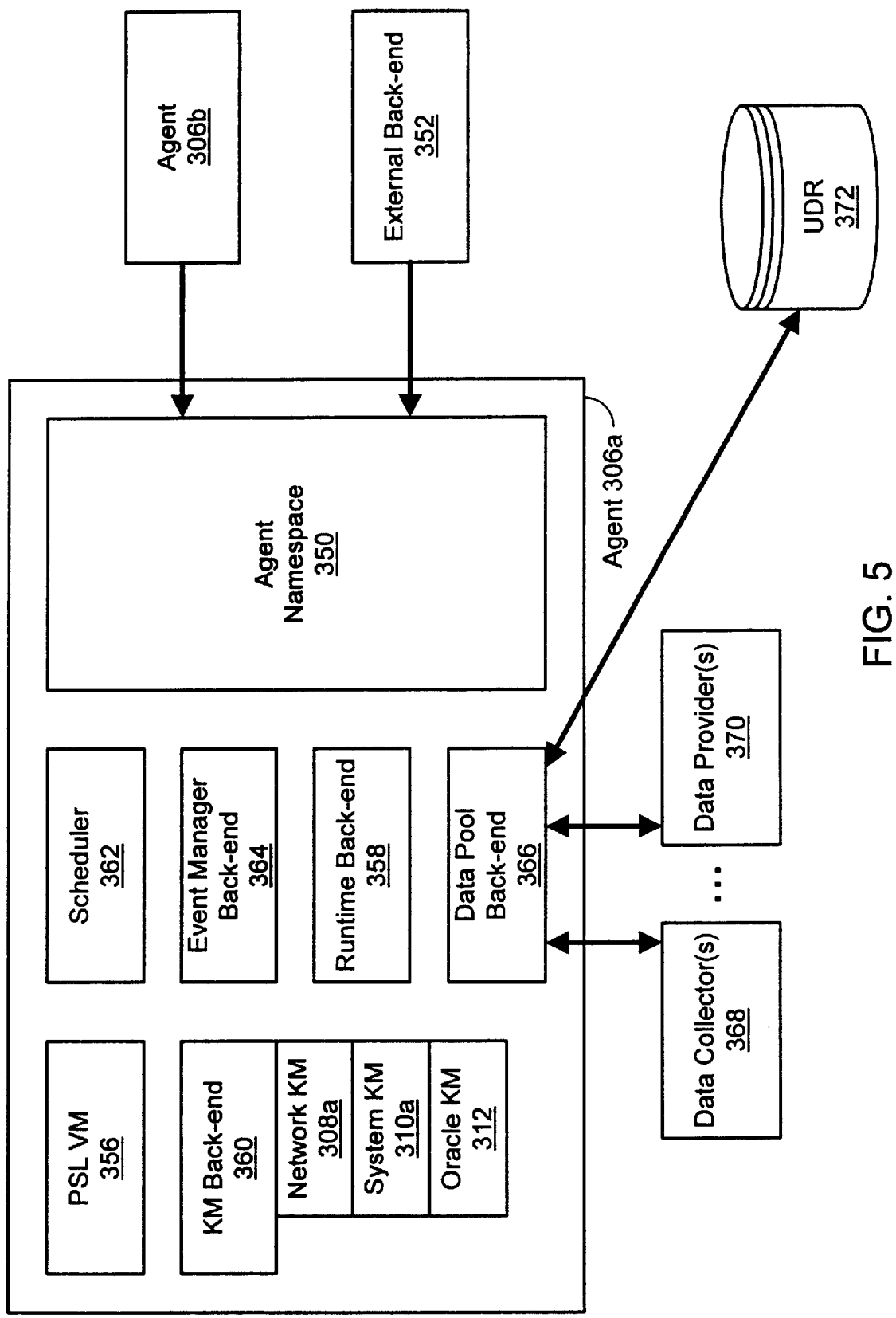
FIG. 5 is a block diagram which illustrates an overview of an agent according to one embodiment.

FIG. 5—Overview of an Agent in the Enterprise Management System

FIG. 5 further illustrates some of the components that may be included an agent 306a according to one embodiment. The agent 306a may maintain an agent namespace 350. The term "namespace" generally refers to a set of names in which all names are unique. As used herein, a "namespace" may refer to a memory, or a plurality of memories which are coupled to one another, whose contents are uniquely addressable. "Uniquely addressable" refers to the property that items in a namespace have unique names such that any item in the namespace has a name different from the names of all other items in the namespace. The agent namespace 350 may comprise a memory or a portion of memory that is managed by the agent application 306a. The agent namespace 350 may contain objects or other units of data that relate to enterprise monitoring.

The agent namespace 350 may be one branch of a hierarchical, enterprise-wide namespace. The enterprise-wide namespace may comprise a plurality of agent namespaces as well as namespaces of other components such as console proxies. Each individual namespace may store a plurality of objects or other units of data and may comprise a branch of a larger, enterprise-wide namespace. The agent or other component that manages a namespace may act as a server to other parts of the enterprise with respect to the objects in the namespace. The enterprise-wide namespace may employ a simple hierarchical information model in which the objects are arranged hierarchically. In one embodiment, each object in the hierarchy may include a name, a type, and zero or more attributes.

In one embodiment, the enterprise-wide namespace may be thought of as a logical arrangement of underlying data rather than the physical implementation of that data. For example, an attribute of an object may obtain its value by calling a function, by reading a memory address, or by accessing a file. Similarly, a branch of the namespace may not correspond to actual objects in memory but may merely be a logical view of data that exists in another form altogether or on disk.

In one embodiment, furthermore, the namespace defines an extension to the classical directory-style information model in which a first object (called an instance) dynamically inherits attribute values and children from a second object (called a prototype). This prototype-instance relationship is discussed in greater detail below. Other kinds of relationships may be modeled using associations. Associations are discussed in greater detail below.

The features and functionality of the agents may be implemented by individual components. In various embodiments, components may be developed using any suitable method, such as, for example, the Common Object Model (COM), the Distributed Common Object Model (DCOM), JavaBeans, or the Common Object System (COS). The components cooperate using a common mechanism: the namespace. The namespace may include an application programming interface (API) that allows components to publish and retrieve information, both locally and remotely. Components may communicate with one another using the API. The API is referred to herein as the namespace front-end, and the components are referred to herein as back-ends.

As used herein, a "back-end" is a software component that defines a branch of a namespace. In one embodiment, the namespace of a particular server, such as an agent 306a, may be comprised of one or more back-ends. A back-end can be a module running in the address space of the agent, or it can be a separate process outside of the agent which communicates with the agent via a communications or data transfer protocol such as the common object system protocol (COSP). A back-end, either local or remote, may use the API front-end of the namespace to publish information to and retrieve information from the namespace.

FIG. 5 illustrates several back-ends in an agent 306a. The back-ends in FIG. 5 are shown for purposes of example; in other configurations, an agent may have other combinations of back-ends. A KM back-end 360 may maintain knowledge modules that run in this particular agent 306a. The KM back-end 360 may load the knowledge modules into the namespace and schedules discovery processes with the scheduler 362 and the PSL VM 356, a virtual machine (VM) for executing scripts. By loading a KM into the namespace, the KM back-end 360 may make the data and/or objects associated with the KM available to other agents and components in the enterprise. As illustrated in FIG. 5, another agent 306b and an external back-end 352 may access the agent namespace 350.

Other agents and components may access the KM data and/or objects in the KM branch of the agent namespace 306a through a communications or data transfer protocol such as, for example, the common object system protocol (COSP) or the industry-standard common object model (COM). In one embodiment, for example, the other agent 306b and the external back-end 352 publish or subscribe to data in the agent-namespace 350 through the common object system protocol. The KM objects and data may be organized in a hierarchy within a KM branch of the namespace of the particular agent 306a. The KM branch of the namespace of the agent 306a may, in turn, be part of a larger hierarchy within the agent namespace 350, which may be part of a broader, enterprise-wide hierarchical namespace. The KM back-end 360 may create the top-level application instance in the namespace as a result of a discovery process. The KM back-end 360 may also be responsible for loading KM configuration data.

In the same way as the KM back-end 360, other back-ends may manage branches of the agent namespace 350 and populate their branches with relevant data and/or objects which may be made available to other software components in the enterprise. A runtime back-end 358 may process KM instance data, perform discovery and monitoring, and run recovery actions. The runtime back-end 358 may be responsible for launching discovery processes for nested application instances. The runtime back-end 358 may also maintain results of KM interpretation and KM runtime objects.

An event manager back-end 364 may manage events generated by knowledge modules running in this particular agent 306a. The event manager back-end 364 may be responsible for event generation, persistent caching of events, and event-related action execution on the agent 306a. A data pool back-end 366 may manage data collectors 368 and data providers 370 to prevent the duplication of collection and to encourage the sharing of data among KMs and other components. The data pool back-end 366 may store data persistently in a data repository such as a Universal Data Repository (UDR) 372. A script language (PSL) virtual machine (VM) 356 may execute scripts. The script VM 356 may also comprise a script language (PSL) interpreter back-end which is responsible for scheduling and executing scripts. A scheduler 362 may allow other components in the agent 306a to schedule tasks.

Other back-ends may provide additional functionality to the agent 306a and may provide additional data and/or objects to the agent namespace 350. A registry back-end may keep track of the configuration of this particular agent 306a and provides access to the configuration database of the agent 306a for other back-ends. An OS command execution back-end may execute OS commands. A layout back-end may maintain GUI layout information. A resource back-end may maintain common resources such as image files, help files, and message catalogs. A mid-level manager (MM) back-end may allow the agent 306a to manage other agents. The mid-level manager back-end is discussed in greater detail below. A directory service back-end may communicate with directory services. An SNMP back-end may provide Simple Network Management Protocol (SNMP) functionality in the agent.

The console proxy 320 shown in FIG. 4 may access agent objects and send commands back to agents. In one embodiment, the console proxy 320 uses a mid-level manager (MM) back-end to maintain agents that are being monitored. Via the mid-level manager back-end, the console proxy 320 accesses remote namespaces on agents to satisfy requests from console GUI modules. The console proxy 320 may implement a namespace to organize its components. The namespace of a console proxy 320 may be an agent namespace with a layout back-end mounted. Therefore, a console proxy 320 is itself an agent. The console proxy 320 may therefore have the ability to load KM packages, interpret, and execute them. In one embodiment, the following back-ends are mounted in the namespace of the console proxy 320: KM back-end 360, runtime back-end 358, event manager back-end 364, registry back-end, OS command execution back-end, PSL interpreter back-end, mid-level manager (MM) back-end, layout back-end, and resource back-end.

Figure 6:
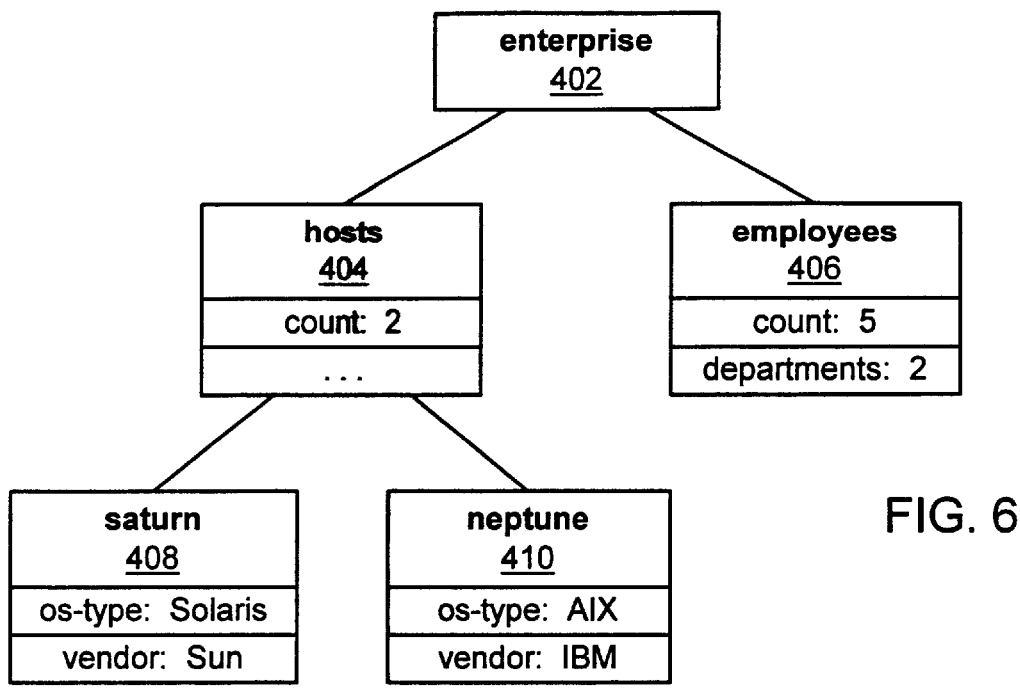
FIG. 6 illustrates a hierarchical organization of information in the namespace according to one embodiment.

FIG. 6—Hierarchical Organization of Information in the Namespace

FIG. 6 illustrates how information is organized hierarchically in the namespace according to one embodiment. In the example shown in FIG. 6, a root object 402 (named "enterprise") has two child objects: "hosts" 404 and "employees" 406. An object may also have zero or more children. The "hosts" object 404 has two child objects of its own: "saturn" 408 and "neptune" 410.

Objects in the tree may be referred to using paths. Paths may be formed by concatenating the object names encountered when traversing the path from the root of the tree to a given object. In one embodiment, the name of the root is not part of the path. For example, the "Saturn" object 408 is uniquely identified—relative to the root—by the following path: "hosts/saturn". Objects contain one or more attributes. In one embodiment, an attribute is a name-value pair whose value is of a primitive type (e.g., integer, float, string), an array type (i.e., an array of primitives), or an object type (i.e., the attribute is a pointer to another object). In one embodiment, the type of an attribute may be specified as a reference to another object, as discussed in more detail below. Object attributes may be referred to using a path and an attribute name. For example, the "vendor" attribute of the "saturn" object 408 is referred to by: "hosts/saturn vendor". Objects may have an associated string type-name to indicate the type of the object. In the example of FIG. 6, the type of the "saturn" object 408 and the "neptune" object 410 is "host". The type of the "host" object is "host-container".

In one embodiment, the namespace has conventions for object names. In one embodiment, three characters are reserved characters which cannot be used in object names: '/' is reserved as a path separator, '*' is reserved as a wild card for queries, and '.' is reserved for specifying relative paths. Twenty-three additional characters are prohibited characters which cannot be used in object names: '!', '#', '%', '^', '&', '$', '?', '(', ')', '[', ']', '{', '}', '\', '"', '|', '"', ';', '<', '>', '~', '+', and '='. Whitespace and newline characters may also be prohibited in object names.

Attributes in the namespace may be primitive-valued or array-valued. In one embodiment, the following attribute types are supported:

bool—boolean;
char—character;
short—two-byte integer;
int—four-byte integer;
float—single precision floating point;
double—double precision floating point;
string—character strings;
datetime—representation of date and time; and
array—an array of any of the above primitive types.

The datetime type may be represented as a string of the form: "yyyymmddhhmmss.mmmmmmsutc", where yyyy is the year, mm is the month, dd is the day, mm is the minute, ss is the second, mmmmmm is the number of microseconds, s is a sign indicator ('+' or '−'), and utc is the offset from UTC in minutes (using the sign defined above).

Figure 7:
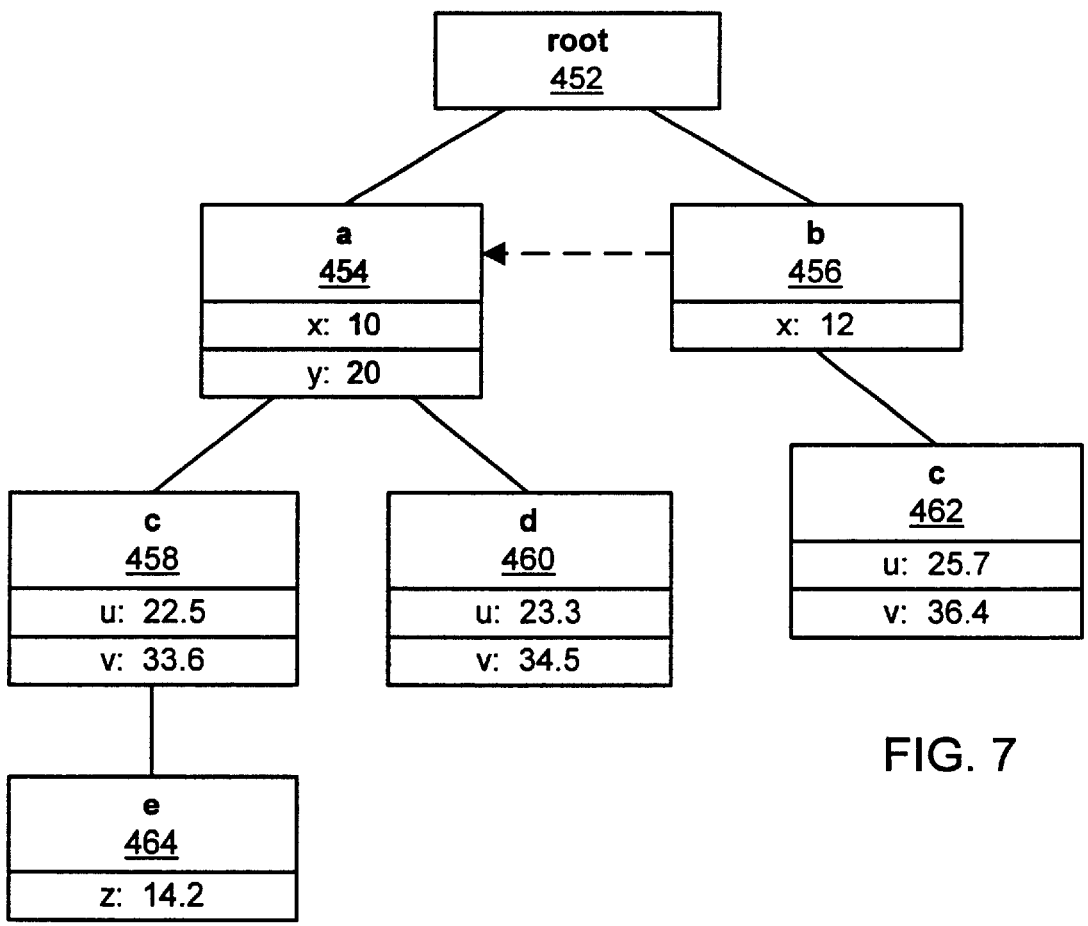
FIG. 7 illustrates dynamic inheritance of attributes, values, and/or children in the namespace according to one embodiment.

FIG. 7—Dynamic Inheritance

One object in the namespace may dynamically inherit attributes, values, and/or children from another object in the namespace. As used herein, a "prototype" is an object in a namespace from which attributes, values, and/or children are dynamically inherited by another object. As used herein, an "instance" is an object in a namespace which dynamically inherits attributes, values, and/or children from another object in the namespace. FIG. 7 illustrates an example of a namespace which includes a prototype-instance relationship. At the top of the sample namespace is the root object 452. In FIG. 7, there is dynamic inheritance link from object "b" 456 to object "a" 454; the link is shown as a dashed arrow. Object "a" 454 functions as the prototype and object "b" 456 functions as the instance. Therefore, object "b" 456 dynamically inherits the attributes, values, and children of object "a" 454. As used herein, "dynamic inheritance" includes the ability to derive attributes, values, and/or children from another object, where the attributes, values, and/or children may change over time. In this example, object "b" 456 has an attribute called "x" of its own and also inherits the attribute "y" from object "a" 454. Object "b" 456 does not inherit the attribute "x" of object "a" 454 because object "b" 456 already has an attribute named "x". Similarly, object "b" 456 has a child object 462 named "c" and also inherits the child object 460 "d" from object "a" 454. However, object "b" 456 does not inherit child object "c" 458 of object "a" 454 because object "b" 456 already has a child object 462 named "c".

To resolve an attribute reference according to one embodiment, the target object (i.e., the instance) is searched first for the attribute. If the attribute is found locally, then the search ends. If the attribute is not found locally, then its prototype is searched. The prototype may also have a prototype of its own, and this chain of prototypes is traversed until either the attribute is found or an object with no prototype is encountered. As an example of attribute inheritance, the following attribute reference denotes the inherited "y" attribute of object "a" 454 whose value is 20: "b y". To see how child inheritance works, consider how the following attribute reference is resolved: "b/d u". Because object "b" 456 does not have a child called "d", the path "b/d" actually refers to "a/d". Then "b" 456 inherits the child "d" 460 from "a" 454.

In one embodiment, an instance not only inherits the direct children of its prototype, but it may also inherit the entire descendant structure of its prototype. For example, "a/c/e" 464, a child of "a/c" 458, is inherited by "b/c" 462. As used herein, "structural inheritance" is the inheritance of the entire structure beneath the prototype.

To further illustrate inheritance in the example namespace given in FIG. 7, the following attribute references would be resolved as follows: "a x" yields 10; "a y" yields 20; "b x" yields 12; "b y" yields 20; "a/c u" yields 22.5; "a/c v" yields 33.6; "a/d u" yields 23.3; "a/d v" yields 34.5; "b/c u" yields 25.7; "b/c v" yields 36.4; "b/d u" yields 23.3; "b/d v" yields 34.5; "a/c/e z" yields 14.2; and "b/c/e z" yields 14.2.

Associations

In one embodiment, associations may be defined for objects. As used herein, an "association" is an object or other piece of data which specifies a relationship between two or more objects. The relevant object paths may be string-valued attributes of the association object. For example, one might use associations to model an object graph. Each association object would act as a vertex and would have attributes such as "to" and "from" to specify the paths of connected objects.

In one embodiment, an association may specify a "part-of" relationship. A "part-of" relationship may be established by creating an attribute in an owner object and setting the reference to the "part" object in the attribute. In one embodiment, an association may specify a "parent-child" relationship. A "parent-child" relationship may be established by specifying the parent object when creating the child object.

In one embodiment, several methods are available for association objects. A getAssociates( ) method may return a list of objects with which a given object is associated. The getAssociates( ) method may accept arguments such as "role" and "type" to restrict the results of the method by specifying the given object and the type of results, respectively. A getAssociations( ) method may return a list of all associations that refer to a given object. The getAssociations( ) method may accept arguments such as "role" and "type" to restrict the results of the method by specifying the given object and the type of results, respectively.

FIG. 8—Schemas

The hierarchical namespace according one embodiment may include schemas. As used herein, a "schema" may specify the valid attribute names and valid attribute types for a given type of object. Therefore, a schema may include an attribute name and an attribute type for each attribute of a type of object. In one embodiment, each object may have an associated schema. In one embodiment, every object may carry a string identifier that indicates the type. Objects of a given type share the same schema.

A schema is similar to the concept of a structure in a programming language such as C. For example, the following C structure might specify the schema for a data type called an employee:

```
struct employee
{
    char last_name[128];
    char first_name[128];
    char middle_initial;
};
```

Figure 8:
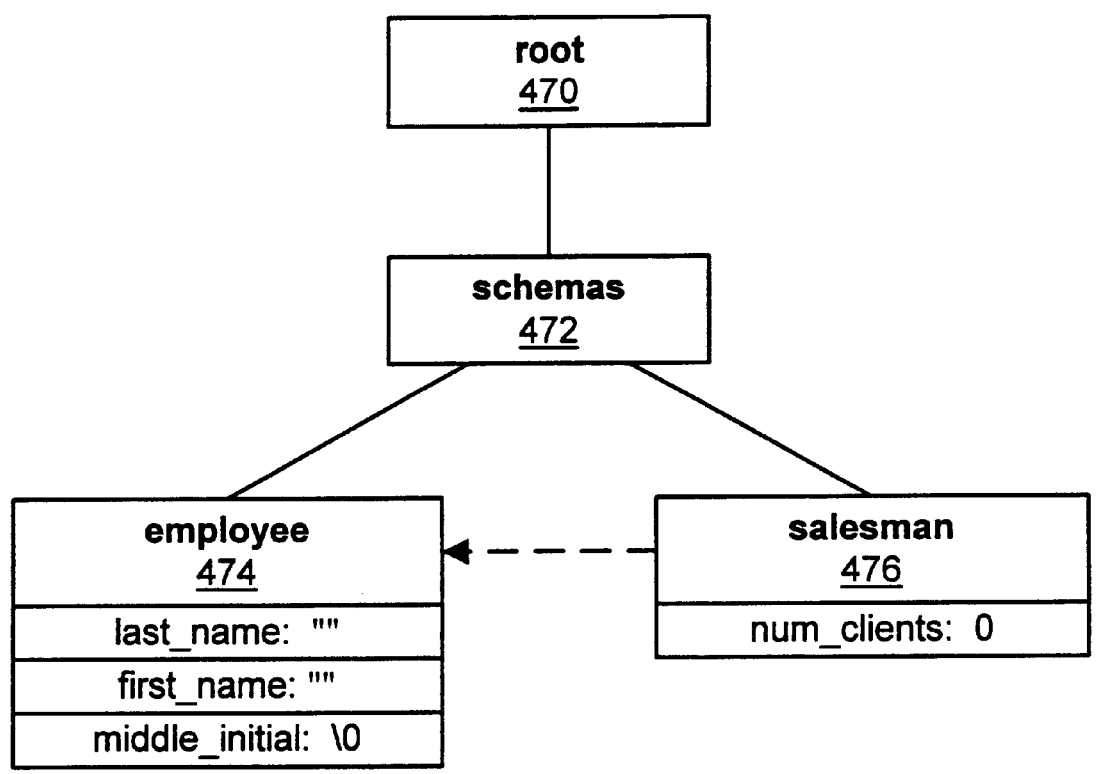
FIG. 8 illustrates schemas in the namespace according to one embodiment.

In one embodiment, a schema is an object of a "schema" type. A schema 474 for an employee object might be as shown in FIG. 8. In the example, employee schema 474 is an object with the name "employee", an attribute named "last_name" of a string datatype, an attribute named "first_name" of a string datatype, and an attribute named "middle_initial" of a character datatype. The schema also stores a value for each attribute in addition to the attribute name and attribute type. The attribute value represents a default value for a newly instantiated object of the type governed by the schema.

In one embodiment, schema objects may be maintained under a "schemas" branch 472 off the root 470 of a local namespace. When a back-end is loaded, the back-end populates the schema branch 472 with the schemas for the object types that the back-end defines. The full path (relative to the root of the local namespace) of the "employee" schema 474 might then be "schemas/employee".

In one embodiment, schemas comprise closed schemas and open schemas. A closed schema permits attributes to be set only if the attribute is already part of the schema. For a closed schema, an attempt to set an attribute whose name-type combination is not found in the schema will fail. An open schema is a schema that may be extended at runtime. For an open schema, an attempt to set an attribute whose name-type combination is not found in the schema will cause the schema to be extended. In this case, the schema becomes object-specific and is no longer shared by objects that were previously of the same type.

In one embodiment, schema objects may include the following methods:

conforms( )—checks to see whether an object conforms to this schema (i.e., whether the object has the same attributes with the proper types);

instantiate( )—instantiates an instance of this object type;

getObjectTraits( )—fetches the traits for this object type; and getAttributeTraits( )—fetches the traits for the given attribute type.

In one embodiment, schemas may be used to support object type hierarchies. Schema objects may take advantage of prototype-instance relationships discussed above to model type hierarchy relationships. For example, a schema 476 for a "salesman" object type may maintain a prototype pointer to the "employee" schema 474, thus inheriting the attribute definitions from the employee schema object 474. The salesman schema 476 would then be an instance of the employee schema 474 and would inherit the last_name, first_name, and middle_initial attributes.

Schemas may be used for several purposes. Schemas may be used to answer "is-a" queries relating to whether an object is a data type. Schemas may be used to support dynamic type checking of operations in the namespace. For example, schemas can be used to prevent setting an attribute to a type which is incompatible with the schema object. Schemas may be used to provide object-type information to generic object editors for automatically building object editing forms. Schemas may be used to validate that object instances conform to a proper object type.

In one embodiment, a schema object may maintain object traits for a particular object type. As used herein, "object traits" are pieces of data that hold additional information about an object type. For example, to support generic object editors, it is advantageous to know the valid child types for a particular object when creating a child of that object. An object trait called "child-types" may be defined to provide this information. The "child-types" object trait may be an array of strings representing object types. The generic object editor may refer to the "child-types" object trait to present a list of valid child types to the user of the generic object editor.

In one embodiment, a schema object may maintain attribute traits for a particular attribute. As used herein, "attribute traits" are pieces of data that hold additional information about one or more attributes. For example, an attribute trait called "values" may hold the set of valid values for a given attribute. An attribute trait called "display" may hold the set of valid values as they would be displayed in a user interface. An attribute trait called "read-only" may be true if the attribute is read-only. An attribute trait called "description" may hold a description of the attribute as a string. An attribute trait called "units" may hold the units of measurement in which the attribute is expressed. An attribute trait called "visible" may be true if user interfaces should make the attribute visible. An attribute trait called "path" may be used to indicate that the attribute contains a path to another object (i.e., the attribute is part of an association).

Publication and Subscription of Events

In one embodiment, the namespace may employ a publish-subscribe model for events. Clients such as agents or consoles may subscribe to events which occur on a particular object in the namespace. In a similar way, clients may publish events in the namespace. The publish-subscribe capability of objects in the namespace may include event propagation which permits clients to subscribe to all events within a particular branch of the namespace by subscribing to the root object of the branch. In one embodiment, clients may restrict the results of a subscription by specifying a criterion or criteria to be met by published events and/or objects.

As used herein, "publishing" includes sending and/or making available to a software component one or more elements of data and/or changes in the data over time. The elements of data may include events or objects. In one embodiment, a "publish( )" method may be provided for objects. The publish( ) method may be used as illustrated by the following C++-style code fragment:

Object*root=getNamespaceRoot( );
Event*e=new MyEvent;
root->publish(c, "a/b/c/d", e);

In this example, the given event is published on the object whose path is "a/b/c/d". Because the publish( ) method takes ownership of the event argument "e" in one embodiment, the client should not use the event "e" again or delete the event. The first argument is a context object "c" that carries contextual information. Contextual information may relate to security for the current user, data structures shared throughout the namespace, additional information about error conditions, and any other contextual information deemed necessary. In one embodiment, events propagate up the namespace hierarchy by default. Therefore, publishing an event on "a/b/c/d" has the same effect as publishing the event on "a/b/c", "a/b", "a", and ".". In one embodiment, this default event propagation may be suppressed by adding a fourth argument "false" to the method call for publish( ).

As used herein, "subscribing" includes expressing an interest in one or more elements of data and/or receiving the data and/or changes in the data over time. The elements of data may include events or objects. In one embodiment, a "subscribe( )" method may be provided for objects. The subscribe( ) method may be used as illustrated by the following C++-style code fragment:

Object*root=getNamespaceRoot( );
TaskID tid;
EventHandler*h=new MyHandler;
root->subscribe(c, tid, "a/b", "create", " ", h);

After the subscribe( ) method is called in this example, a handle( ) method of the user's handler "h" may be invoked every time a "create" event is published on or below the "a/b" object. In one embodiment, after calling subscribe( ), the handler object "h" belongs to an event manager and should be not be used again or deleted by the subscribing entity. The first argument is a context object "c" that carries contextual information. The fourth argument may be used to specify an event filter in one embodiment. In the example above, the "create" filter eliminates non-creation events from the subscription by subscribing only to object creation events. The fifth argument may be used to specify additional criteria for the filter in one embodiment. For example, in the case of the "set" event, which may be published whenever the value of an attribute is set, this fifth argument may be the name of the attribute whose set event is of interest. If the fifth argument is "*", then all set events will be returned in one embodiment.

In one embodiment, a "cancel( )" method may be provided for objects. In one embodiment, cancel( ) uses the TaskID obtained from the subscribe( ) method. The cancel( ) method may be used as illustrated by the following C++-style code fragment, wherein the first argument is a context object "c":

Object*root=getNamespaceRoot( );
TaskID tid;
root->cancel(c, tid);

In one embodiment, a plurality of event filters are provided. A "create" filter may select object-creation events. A "destroy" filter may select object-destruction events. An "implicit-destroy" filter may select events in which an object is implicitly destroyed. A "remove" filter may select attrribute-removal events. A "set" filter may select events in which the value of an attribute is set for a particular attribute name or names (where "*" selects all attributes). An "sql-1" filter may select events in which a Structured Query Language (SQL) statement is satisfied. An "all" filter may select any event. Additional filters may be defined by deriving from a base class for event filters.

In one embodiment, an event-subscription table is utilized to map paths to event-filter/event-handler pairs. When an event is published on an object, the subscription table is checked to determine if there are any subscribers for that object. If so, the filter is evaluated against the event. If the evaluation is true, then an event/event-handler pair is formed and enqueued on an event queue. The event queue may be used to avoid re-entrancy problems which may be encountered when event handlers do further publications and subscriptions. When the event queue is flushed, the appropriate handlers are invoked.

Figure 9:
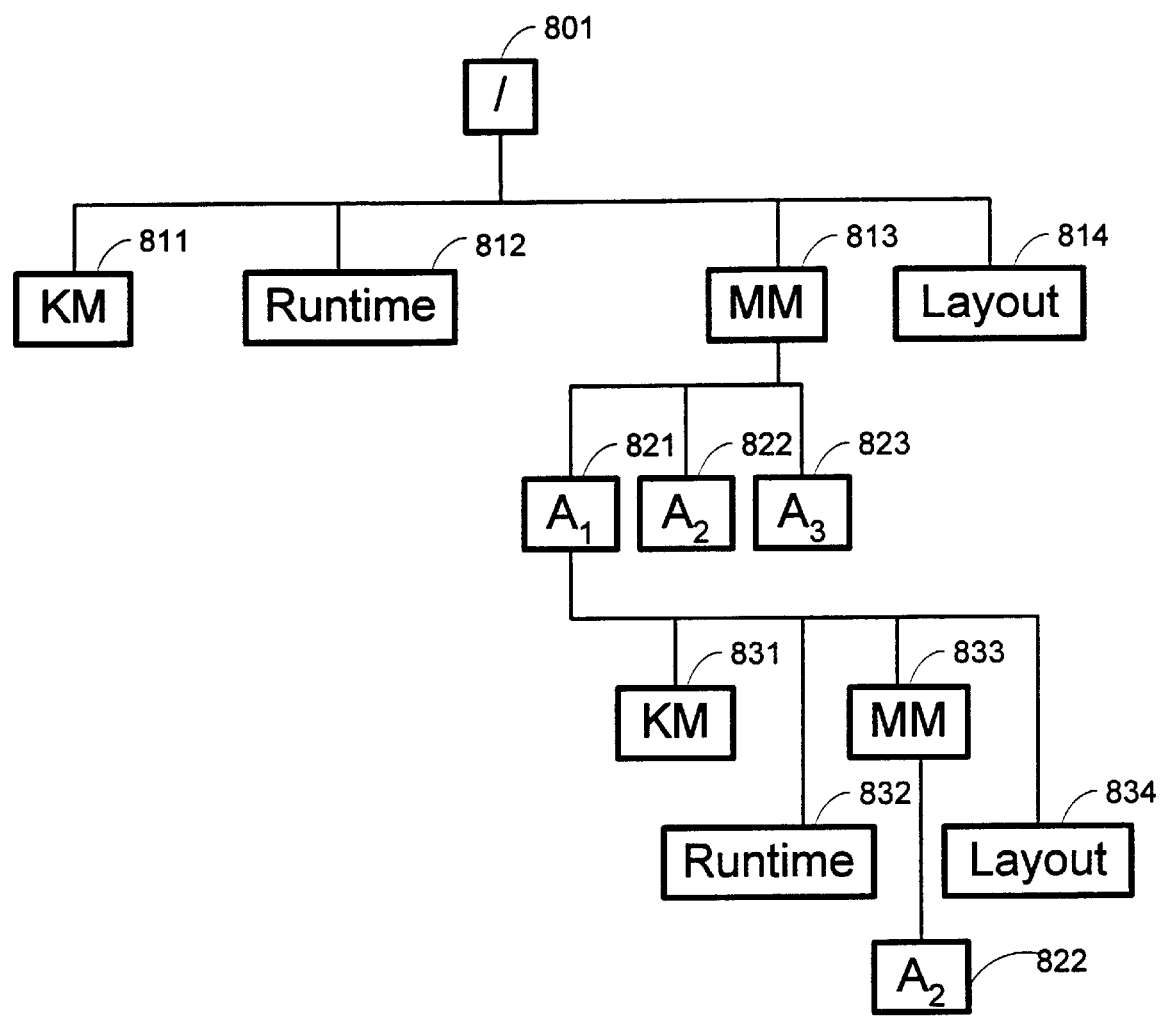
FIG. 9 illustrates an example of an enterprise-wide namespace according to one embodiment.

FIG. 9—An Example of an Enterprise-Wide Namespace

FIG. 9 illustrates the hierarchical nature of the enterprise-wide namespace by way of an example namespace according to one embodiment. The enterprise-wide namespace may include multiple tiers. In various embodiments, namespace tiers may be distributed in multiple agents running on computers or hosts in an enterprise network. A namespace tier may be implemented in one agent. Namespace tiers may be connected with mid-level manager back-ends in namespace tiers. A namespace tier may be constructed as follows. At the top level of a tier is the root 801. At the level directly below the root, the namespace tier may be organized into four branches: a knowledge module (KM) branch 811, a runtime branch 812, a mid-level manager (MM) branch 813, and a layout branch 814. These four branches are shown for purposes of illustration; in various configurations, a namespace tier may include any number of branches in other combinations. The KM branch 811 may include objects and/or data relating to discovering managed objects and corresponding monitoring activities. The runtime branch 812 may include managed object instances and/or data created by discovery processes. The layout branch 814 may include objects and/or data relating to layout or GUI objects used in the console or other GUI-based components. The mid-level manager branch 813 may include objects and/or data relating to the maintenance of lower-level namespace tiers of a mid-level manager agent. To an agent, agents that implement its lower-level namespace tiers may be called subagents. That agent may be called a master agent with respect to the subagents. An agent with its namespace tier in the middle of an enterprise-wide namespace is thus a master agent and a subagent.

The MM branch 813 may include child entries for a plurality of agents. As illustrated by way of example in FIG. 9, the MM branch 813 may include agent $A_1$ 821, agent $A_2$ 822, and agent $A_3$ 823. Each agent namespace may then include branches which are managed by back-ends in the agent. As shown in FIG. 9, for example, agent $A_1$ 821 may include a KM branch 831, a runtime branch 832, an MM branch 833, and a layout branch 834.

The same subagent may appear in MM branches of different master agents. For example, in FIG. 9, agent $A_2$ 822 may be configured in two MM branches 813 and 833. When organizing agents to construct enterprise-wide namespaces, the rule may apply that the enterprise-wide namespace is a tree structure, i.e., there are no loops in the hierarchy.

Figure 10:
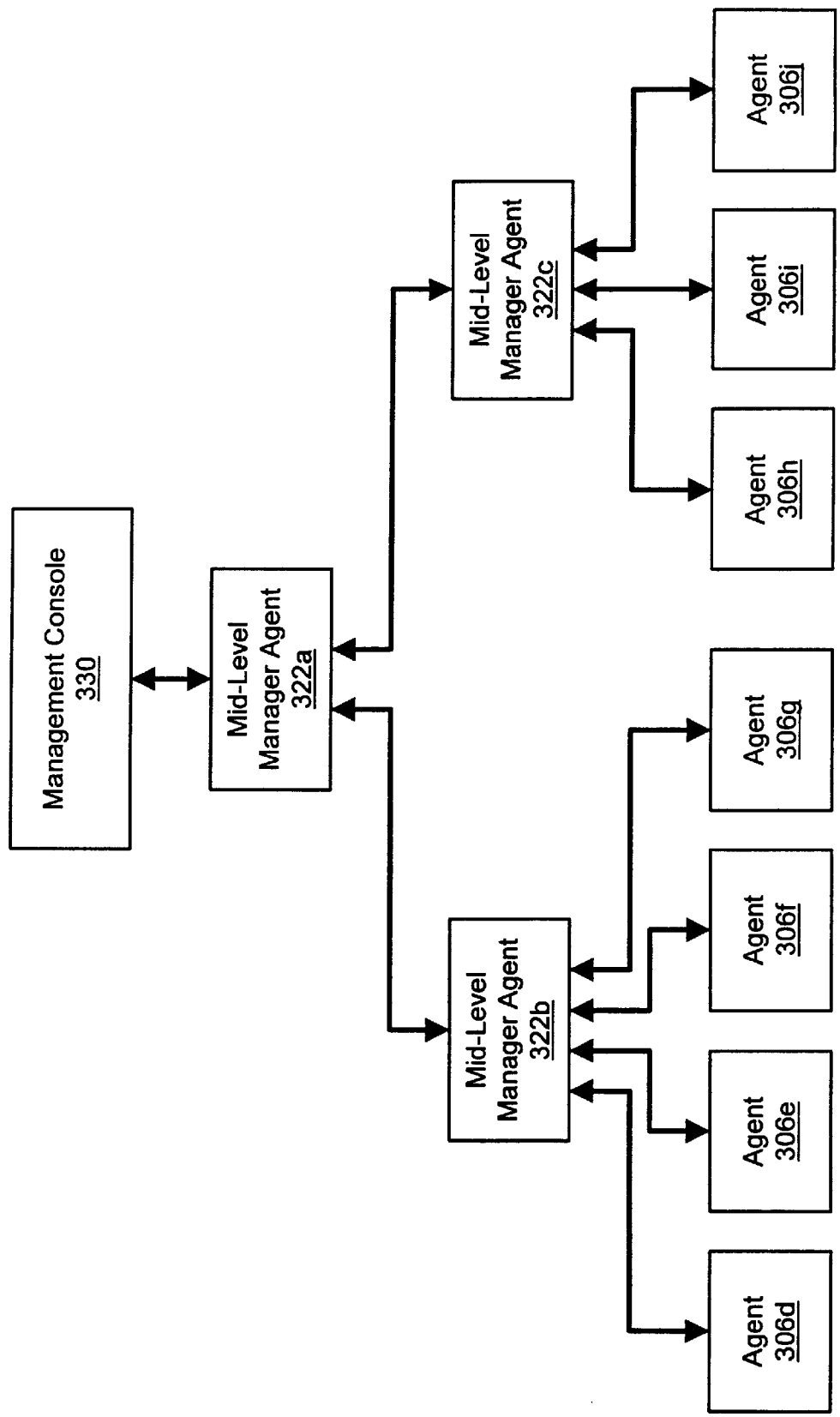
FIG. 10 illustrates an enterprise management system including mid-level manager agents according to one embodiment.

FIG. 10—Enterprise Management System Including Mid-Level Managers

In one embodiment, the improved enterprise management system and method may also include one or more mid-level managers. In one embodiment, a mid-level manager is an agent that has been configured with a mid-level manager back-end. The mid-level manager may be used to represent the data of multiple managed agents. FIG. 10 illustrates an enterprise management system including a plurality of mid-level managers according to one embodiment. A management console 330 may exchange data with a higher-level mid-level manager agent 322*a*. The higher-level mid-level manager agent 322*a* may manage and consolidate information from lower-level mid-level manager agents 322*b* and 322*c*. The lower-level mid-level manager agents may then manage and consolidate information from a plurality of agents 306*d* through 306*j*. In one embodiment, the enterprise management system may include zero or more levels of mid-level manager agents and one or more other agents.

Advantages of Mid-Level Managers

The use of a mid-level manager may tend to bring many advantages. First, it may be desirable to funnel all traffic via one connection rather than through many agents. Use of only one connection between a console and a mid-level manager agent may therefore result in improved network efficiency.

Second, by combining the data on the multiple managed agents to generate composite events or correlated events, the mid-level manager may offer an aggregated view of data. In other words, an agent or console at an upper level may see the overall status of lower levels without being concerned about individual agents at those lower levels. Although this form of correlation could also occur at the console level, performing the correlation at the mid-level manager level tends to confer benefits such as enhanced scalability.

Third, the mid-level manager may offer filtered views of different levels, from enterprise levels to detailed system component levels. By filtering statuses or events at different levels, a user may gain different views of the status of the enterprise.

Fourth, the addition of a mid-level manager may offer a multi-tiered approach towards deployment and management of agents. If one level of mid-level managers is used, for example, then the approach is three-tiered. Furthermore, by supporting inter-communication between mid-level managers and other mid-level managers, the improved enterprise management system may support a multi-tiered architecture with an arbitrary number of levels. In other words, a higher level of mid-level managers may manage a lower level of mid-level managers, and so on. This multi-tiered architecture may allow one console to manage a large number of agents more easily and efficiently.

Fifth, the mid-level manager may allow for efficient, localized configuration. Without a mid-level manager, the console must usually provide configuration data for every agent. For example, the console would have to keep track of valid usernames and passwords on every managed machine in the enterprise. With a multi-tiered architecture, however, several mid-level managers rather than a single, centralized console may maintain configuration information for local agents. With the mid-level manager, therefore, the difficulties of maintaining such centralized information may in large part be avoided.

Mid-Level Manager Back-End

In one embodiment, mid-level manager functionality may be implemented through a mid-level manager back-end. The mid-level manager back-end may be included in any agent that is desired to be deployed as a mid-level manager. In one embodiment, the top-level object of the mid-level manager back-end may be named "MM." As discussed with reference to FIG. 9, the agents managed by a mid-level manager are referred to herein as "sub-agents." The mid-level manager back-end may maintain a local file called a sub-agent profile to keep track of sub-agents. When a mid-level manager starts, it may read the sub-agent profile file and, if specified in the profile, connect to sub-agents via a "mount" operation provided by the common object system protocol. The profile may be set up by an administrator in a deployment server and deployed to the mid-level manager.

For each sub-agent managed by the mid-level manager, a proxy object may be created under the top-level object "MM." Proxy objects are entry points to namespaces of sub-agents. In the mid-level manager, objects such as back-ends in sub-agents may be accessed by specifying a path-name of the form "/MM/sub-agent-name/object-name/ . . . ." The following events may be published on proxy objects to notify back-end clients: connect, disconnect, connection broken, and hang-up. The connect event may notify clients that the connection to a sub-agent has been established. The disconnect event may notify clients that a sub-agent has been disconnected according to a request from a back-end. The connection broken event may notify clients that the connection to a sub-agent has been broken due to network problems. The hang-up event may notify clients that the connection to a sub-agent has been broken by the sub-agent.

In one embodiment, the mid-level manager back-end may accept the following requests from other back-ends: connect, disconnect, register interest, and remove interest. The "connect" request may establish a connection to a sub-agent. In the profile, the sub-agent may then be marked as "connected." The "disconnect" request may disconnect from a sub-agent. In the profile, the sub-agent may then be marked as "disconnected." The "register interest" request may have the effect of registering interest in a knowledge module (KM) package in a sub-agent. The KM package may then be recorded in the profile for the sub-agent. The "remove interest" request may have the effect of removing interest in a KM package in a sub-agent. The KM package may then be removed from the profile of the sub-agent.

The mid-level manager back-end may provide the functionality to add a subagent, remove a subagent, save the current set of subagents to the subagent profile, load sub-agents from the subagent profile, connect to a subagent, disconnect from a subagent, register interest in a KM package in a sub-agent, remove interest in a KM package in a sub-agent, push KM packages to subagents in development mode for KM development, and/or erase KM packages from subagents in development mode.

The mid-level manager back-end may have two object classes: "mmManager" and "mmProxy." An "mmManager" object may keep track of a set of "mmProxy" objects. An "mmManager" object may be associated with a subagent profile. An "mmProxy" object may represent a sub-agent in a master agent. It may be the entry point to the namespace of the sub-agent. In one embodiment, most of the mid-level manager functionality may be implemented by these objects.

The "mmManager" Object

In the mid-level manager backend of a master agent, multiple "mmManager" objects may be created to represent different domains of sub-agents, respectively. An "mmManager" object may be the root object of a mid-level manager back-end instance. In one embodiment, an "mmManager" class corresponding to the "mmManager" object is derived from a "Cos_VirtualObject" class. The name of an "mmManager" object may be set to "MM" by default. In one embodiment, it may be set to any valid Common Object System (COS) object name as long as the name is unique among other COS objects under the same parent object. Attributes of an "mmManager" object may include the attributes shown in the table in FIG. 11. An attribute with access code "C" is set only during initialization. Access code "G" means that an attribute is readable by other back-ends using a COS "get" method. Access code "S" means that an attribute is settable by other back-ends using a COS "set" method.

A subagent may be added to a MM back-end by calling the "createObject" method of its "mmManager" object. This method may support creating an "mmProxy" object as a child of the "mmManager" object. In one embodiment, an "mmProxy" object should have a name that is unique among "mmProxy" objects under the same "mmManager" object. A subagent may be removed from an MM back-end by calling the "destroyObject" method of its associated "mmManager" object.

After an "mmManager" object is created, the "load" method may be called to load the associated subagent profile. The "load" method may be available via a COS "execute" call. In one embodiment, a subagent profile is a text file in MOF format with multiple MOF instances representing subagents. A subagent is represented as a MOF instance. A MOF instance has multiple attributes as shown in the table in FIG. 12, which is the class definition of the "mmProxy" object.

In one embodiment, if "*" is used in both the "included KM packages" and "excluded KM packages" fields, the one in "excluded KM packages" field takes precedence. That is, no KM packages will be of interest for that subagent.

In one embodiment, the "mmManager" object supports the "save" method to save subagent information to the associated subagent profile file. The "save" method may be available via a COS "execute" call. When the "save" method is called, the "mmManager" object may scan children that are "mmProxy" objects. For each "mmProxy" child, a MOF instance may be printed as defined in the above table. The "mmManager" object may use a dirty bit to synchronize itself with the associated subagent profile.

The "mmProxy" Object

An "mmProxy" object may provide the entry point to the namespace of the subagent that it represents. The "mmProxy" object may be derived from the COS mount object. In one embodiment, the name of an "mmProxy" object is usually the name of the corresponding subagent. Attributes of an "mmProxy" object may be as shown in the table in FIG. 13.

After an "mmProxy" object is created, the "connect" method may be called to connect to the subagent. The connection state attribute may be updated to reflect the progress of the connect progress. In one embodiment, when a non-zero heartbeat time is given, an "mmProxy" object will periodically check the connection with the subagent. If the subagent does not reply in the heartbeat time, the "BROKEN" connection state is reached. Setting this attribute to zero disables the heartbeat checking. The user name given in the user ID attribute is used to obtain an access token to access the subagent's namespace. The privilege of the master agent in the subagent is determined by the subagent using the access token. The "disconnect" method may be called to disconnect from the subagent.

An "mmProxy" object keeps track of KM packages that are available in the corresponding subagent and are of interest to the master agent. The "included KM packages" and "excluded KM packages" attributes are initialized when the "mmProxy" object is loaded from the subagent profile. They are empty if the "mmProxy" object is created after the subagent profile is loaded. The "effective KM packages" attribute is determined based on the value of "included KM packages" and "excluded KM packages" attributes. The rules may be as shown in the table in FIG. 14.

In one embodiment, the "mmProxy" object may support four methods for KM package management: "register", "remove", "include" and "exclude". These methods may be available via a COSP "execute" call. Calling "register" may add a KM package to the effective KM package list, if the KM package is not already in the list. The KM package may be optionally added to the "included KM packages" list. Calling "remove" may remove a KM package from the effective KM package list, and optionally add it to the "excluded KM packages" list. In both methods, the KM package may be given as the first argument of the "execute" call. The second argument may specify whether to add the KM package to the "included/excluded KM packages" list.

Calling "include" may add a KM package to the "included KM packages" list if it is not already in the list. Calling "exclude" may add a KM package to the "excluded KM packages" list if it is not already in the list. In one embodiment, the KM package is given as the first argument of the "execute" call. Optionally, a second argument may be used to specify whether a replace operation should be performed instead of an add operation. If the "included/excluded KM packages" list is changed by a call, the "effective KM packages" may be recalculated based on the mentioned rules. When the "effective KM packages" list is changed, the "mmProxy" object may communicate to the KM back-end of the subagent to adjust the KM interest of the master agent, which is described below.

When an "mmProxy" object successfully connects to the corresponding subagent, it may register KM interest in the subagent based on the value of its "effective KM packages" attribute. For each effective KM package, the "mmProxy" object may issue a "register" COSP "execute" call on the remote "/KM" object, passing the KM package name as the first argument. Upon receiving this call, the KM back-end in the subagent may load the KM package if it is not already loaded and may initiate discovery processes.

The "mmProxy" object may have a class-wide event handler to watch the value of the "effective KM packages" attributes of "mmProxy" objects. This event handler may subscribe to "Cos_SetEvent" events on that attribute. Upon receiving a "Cos_SetEvent" event, this event handler may perform the following actions. For each KM package that is included in the "old value" and is not included in the "new value" of the attribute, the event handler may issue a "remove" COSP "execute" call on the remote "/KM" object. For each KM package that is not included in the "old value" and is included in the "new value" of the attribute, the event handler may issue a "register" COSP "execute" call on the remote "/KM" object.

MM Back-End Events

In one embodiment, the MM back-end may use standard COS events, as shown in the table in FIG. 15.

KM Development Console

The MM back-end may also serve as the gateway to development agents for a development console. The development console may include a KM IDE and production console. The KM IDE may provide editing functionality, and the production console may provide monitoring functionality. Combined, they may provide an integrated development and testing environment. The KM IDE may maintain a COS namespace and may mount the KM back-end and the MM back-end. KM packages under development may be maintained in the KM back-end, and development agents may be maintained in the MM back-end. Via the MM back-end, the KM IDE may have seamless access to KM namespaces of development agents.

The production console may include a GUI component and a namespace component. The namespace component may include a separate process supporting a console namespace. In one embodiment, a console namespace is an agent namespace with layout back-ends. The KM IDE may add the namespace component to its MM back-end to test KM packages such as KM that perform view consolidation and KM that implement specific views.

The KM IDE may mount the KM back-end in its namespace. KM data that is edited may be maintained in the KM back-end. GUI modules of the KM IDE may access KM data via the COS API, including the "createObject", "destroyObject", "get", and "set" methods. The KM IDE may save KM packages under development as files by serializing KM packages in the KM back-end. The KM IDE may load KM packages by decoding KM package files. The result may be downloaded to development agents for testing. The mechanism of downloading KM packages and keeping them synchronized between KM IDE and development agents is described below.

In one embodiment, it is necessary to download a KM package to appropriate development agents to test the KM package. In addition, it may be necessary to keep a KM package synchronized between the KM IDE and development agents. This synchronization may be achieved by a KM sync module in the KM IDE. When the KM IDE starts, event handlers may be created in the KM sync module, including a load handler and an unload handler.

The load-handler may subscribe to a "KM_LoadEvent" event on the "/KM" object. When a KM package is loaded, the handler may receive the event and perform the following actions. For each MM back-end, iterate through each subagent, i.e., development agent. Test to see if the KM package is included in the "effective KM packages" list of the subagent. If yes, issue a COS "execute" call on the remote "/KM" object in the subagent, calling the "load" method and passing the serialized KM package that is loaded in the KM IDE as the argument. The KM back-end in the subagent may then load the KM package, and the runtime back-end may then start running the KM package.

The unload-handler may subscribe to a "KM_UnloadEvent" event on the "/KM" object. When a KM package is unloaded in the KM IDE, the handler may receive the event and perform the following actions. For each MM back-end, iterate through each subagent, i.e., development agent. Test to see if the KM package is included in the "effective KM packages" list of the subagent. If yes, issue a COS "execute" call on the remote "/KM" object in the subagent, calling the "unload" method and passing the KM package name that is unloaded in the KM IDE as the argument. In one embodiment, runtime objects in the subagent will be destroyed, and the KM package will be unloaded in the subagent.

After a KM package has been downloaded to development agents, it may be necessary to keep it synchronized between the KM IDE and the development agents. This may be achieved as follows.

When the KM IDE creates a new object in the local KM back-end, the local KM back-end may perform a remote "createObject" operation in the KM back-ends of involved development agents. The same object is then created in KM back-ends of involved development agents. The KM back-end of a development agent then may publish a "KM_CreateObjectEvent" to notify the runtime back-end to pickup the new object.

When the KM IDE destroys an object in the local KM back-end, the local KM backend may perform a remove "destroyObject" operation in the KM back-ends of involved development agents. The same object is then destroyed in KM back-ends of involved development agents. The KM backend of a development agent then may publish a "KM_DestroyObjectEvent" to notify the runtime back-end to destroy runtime objects that are instances of the destroyed KM object.

The KM IDE may launch a dialog window to perform editing of a KM object. When the "OK" or "Apply" button of the dialog window is pushed, the KM IDE may change the corresponding KM data structure basing on values from the dialog window by calling the "setAttributeValue" COS function in the local KM back-end. The local KM back-end may perform "setAttributeValue" operations in the KM back-ends of involved development agents. The same changes are then applied to KM back-ends of involved development agents. The KM back-end of a development agent then may publish a "KM_ModifyObjectEvent" to notify the runtime back-end to pickup the change. This mechanism is summarized in the table in FIG. 16.

Various files may be referred in a KM package, such as PSL command files and OS command files. A "pull" approach may be used to reference these files and enable development agents to run the KM package. In one embodiment, files are not transferred until they are used. Instead, a KM attribute that is a filename may contain the last modified timestamp of the file. When a development agent uses such a file, it may match the modified timestamp of the local file with the timestamp sent by the development console. If the file is out of date, the development agent may publish an event to request the file from development console. The procedure is as follows.

The development agent may publish a "KM_FileSyncEvent" event on the object that owns the filename attribute to request file transfer. The attribute name may be included in the event to indicate which file to be transferred. The development agent may subscribe to the "KM_FileSyncDoneEvent" event on the object that owns the filename attribute. An operation in the development agent that needs the file may suspend and may continue when this event is received. The KM IDE may subscribe to the "KM_FileSyncEvent" event. Upon receiving the event, the KM IDE may start a COSP FTP (File Transfer Protocol) sequence to transfer the required file. When the file transfer is done, the client object of the COSP FTP sequence may publish a "KM_FileSyncDoneEvent" on the object that owns the file attribute to notify the development agent of the availability of the file.

In the development console, the production console may serve as the testing component. It may provide the functionality for a KM developer to test KM packages under development. The production console may share the development agents that are used by the KM IDE. It may monitor the KM packages that are on the "effective KM packages list" lists of all subagents. The architecture for sharing KM data between a KM IDE component and a production console component in a development console according to one embodiment is specified below.

KM packages may be downloaded from the KM IDE to development agents via MM back-end for testing. To monitor KM packages that are running in development agents, an appropriate master agent and subagent topology hierarchy may be set up, starting from the production console. In one embodiment, the KM developer must have the right to modify the MM back-end in the agent component of the production console and in all development agents. In the KM IDE, KM packages that perform view consolidation and correlation may be developed as normal KM packages. To test such a KM package, the KM IDE may down load the KM package to master agents that are in higher layers of the topology hierarchy.

The Agent API and the MM Back-End

The MM back-end may also provide a programming interface for client access to agents. A client that desires to access information in agents may be implemented using the COS-COSP infrastructure discussed above. With a namespace established it then may mount MM back-ends into the namespace. If the mount operations are successful, then the client has full access to namespaces of subagents under security constraints.

In one embodiment, the API to access subagents is the COS API, including methods such as "get", "set", "publish", "subscribe", "unsubscribe", and "execute". Full path names are used to specify objects in subagents. Using "subscribe", a client may obtain events published in the namespaces of subagents. Using "set" and "publish", a client may trigger activities in subagents. In one embodiment, performance enhancement may be achieved by introducing a caching mechanism into COSP.

In one embodiment, before this API is available to a client, the client must be authenticated with a security mechanism. The client must provide identification information to be verified that it is a valid user in the system. In one embodiment, the procedure for a client program to establish access to agents is summarized as follows. A COS namespace may be created. An access token may be obtained by completing the authentication process. MM back-ends may be mounted, and subagent profiles may be loaded. The client program may connect to subagents. The client program may then start accessing objects in subagents using the COS API.

Various embodiments further include receiving or storing instructions and/or data implemented in accordance with the foregoing description upon a carrier medium. Suitable carrier mediums include storage mediums such as magnetic or optical media, e.g., disk or CD-ROM, as well as signals or transmission media such as electrical, electromagnetic, or digital signals, conveyed via a communication medium such as networks 202 and 204 and/or a wireless link.

Although the system and method of the present invention have been described in connection with several embodiments, the invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A method for managing an enterprise, wherein the enterprise comprises one or more networked computer systems, the method comprising:
   providing a hierarchical namespace;
   adding a plurality of objects to the namespace, wherein the objects relate to software and hardware of the one or more computer systems;
   sharing the plurality of objects with a plurality of the one or more computer system, wherein at least one of the objects is a prototype and at least one of the objects is an instance, wherein the instance dynamically inherits traits from the prototype; and wherein the values of the traits inherited from the prototype change dynamically.

2. The method of claim 1,
   wherein sharing the plurality of objects with the plurality of the one or more computer systems further comprises sharing data and events with the plurality of the one or more computer systems.

3. The method of claim 1,
   wherein sharing the plurality of objects with the plurality of the one or more computer systems further comprises mounting local objects and remote objects.

4. The method of claim 1,
   defining an association of a plurality of objects which specifics a relationship between the objects.

5. The method of claim 1,
   wherein the inherited traits comprise child objects.

6. The method of claim 1,
   wherein the inherited traits comprise attribute values and child objects.

7. The method of claim 1,
wherein each computer system of the plurality of the one or more networked computer systems stores an agent application, wherein the agent application is configurable to monitor the software and hardware of a computer system.

8. A method for managing an enterprise, wherein the enterprise comprises one or more networked computer systems, the method comprising:
distributing a plurality of objects across the one or more networked computer systems of the enterprise, wherein the objects relate to software and hardware of the one or more computer systems of the enterprise;
creating a namespace, wherein the namespace comprises a logical arrangement of the objects stored hierarchically;
sharing the namespace with the one or more computer systems of the enterprise, comprising sharing the objects with the one or more computer systems of the enterprise;
wherein at least one of the objects is a prototype and at least one of the objects is an instance, wherein the instance dynamically inherits traits from the prototype; and wherein the values of the traits inherited from the prototype change dynamically.

9. The method of claim 8,
wherein sharing the namespace with the one or more computer systems of the enterprise further comprises sharing data and events with te one or more computer systems of the enterprise.

10. The method of claim 8,
wherein sharing the namespace with the one or more computer systems of the enterprise further comprises mounting local objects and remote objects.

11. The method of claim 8,
wherein the inherited traits comprise child objects.

12. The method of claim 8,
wherein the inherited traits comprise attribute values and child objects.

13. The method of claim 8,
wherein each computer system of the plurality of the one or more networked computer systems stores an agent application, wherein the agent application is configurable to monitor the software and hardware of a computer system.

14. An application programming interface for managing an enterprise, wherein the application programming interface enables a first application to:
share a plurality of objects stored in a hierarchical namespace with a plurality of other applications;
designate a prototype, wherein the prototype is one of the plurality of objects;
designate an instance, wherein the instance is one of the plurality of objects, and wherein the instance dynamically inherits traits from the prototype; and wherein the values of the traits inherited from the prototype change dynamically.

15. The application programming interface of claim 14,
wherein in enabling the first application to share the plurality of objects with a plurality of other applications, the application programming interface further enables the first application to share data and events with the plurality of other applications.

16. The application programming interface of claim 14,
wherein in enabling the first application to share the plurality of objects with a plurality of other applications, the application programming interface further enables the first application to mount local objects and remote objects.

17. The application programming interface of claim 14,
wherein the inherited traits comprise child objects.

18. The application programming interface of claim 14,
wherein the inherited traits comprise attribute values and child objects.

19. The application programming interface of claim 14,
wherein the first application and the plurality of other applications comprise agent applications, wherein each of the agent applications is configurable to monitor the software and hardware of a computer system.

20. The application programming interface of claim 14,
wherein the first application and the other applications are located on a plurality of networked computer systems.

21. A system for managing an enterprise, the system comprising:
one or more networked computer systems, wherein each of the networked computer systems comprises:
a CPU;
a system memory coupled to the CPU, wherein the system memory stores a plurality of objects in a hierarchical namespace, wherein the objects relate to software and hardware of the one or more networked computer systems;
wherein the system memory stores program instructions executable by the CPU, wherein the program instructions are executable to share the objects with a plurality of the one or more networked computer systems;
wherein the system memory of at least one of the networked computer systems stores:
a prototype, wherein the prototype is one of the plurality of objects stored in the system memory;
an instance, wherein the instance is one of the plurality of objects stored in the system memory, wherein the instance dynamically inherits traits from the prototype, and wherein the values of the traits inherited from the prototype change dynamically.

22. The system of claim 21,
wherein in sharing the objects with the plurality of the one or more networked computer systems, the program instructions are further executable to share data and events with the plurality of the one or more networked computer systems.

23. The system of claim 21,
wherein in sharing the objects with the plurality of the one or more networked computer systems, the program instructions are further executable to mount local objects and remote objects.

24. The system of claim 21,
wherein the system memory further stores an association of a plurality of objects which specifies a relationship between the objects.

25. The system of clam 21,
wherein the inherited traits comprise child objects.

26. The system of claim 21,
wherein the inherited traits comprise attribute values and child objects.

27. The system of claim 21,
wherein the system memory of each of the networked computer systems stores an agent application, wherein the agent application is configurable to monitor the software and hardware of a computer system.

28. A carrier medium comprising program instructions for managing an enterprise, wherein the enterprise comprises one or more networked computers, wherein the program instructions comprising instructions to:

provide a hierarchical namespace;

add a plurality of objects to the namespace, wherein the objects relate to software and hardware of the one or more computer systems;

share the plurality of objects with a plurality of the one or more computer systems, wherein at least one of the objects is a prototype and at least one of the objects is an instance, wherein the instance inherits traits from the prototype; and wherein the values of the traits inherited from the prototype change dynamically.

29. The carrier medium of claim 28, wherein the instructions to share the plurality of objects with the plurality of the one or more computer systems, further comprising program instructions executable to implement sharing data and events with the plurality of the one or more computer systems.

30. The carrier medium of claim 28, wherein the instructions to share the plurality of objects with the plurality of the one or more computer systems, further comprising program instructions executable to implement mounting local objects and remote objects.

31. The carrier medium of claim 28, wherein the inherited traits comprise child objects.

32. The carrier medium of claim 28, wherein the inherited traits comprise attribute values and child objects.

33. The carrier medium of claim 28, wherein each computer system of the plurality of the one or more networked computer systems stores an agent application, wherein the agent application is executable to monitor the software and hardware of a computer system.

34. The carrier medium of claim 28, wherein the carrier medium comprises a memory medium.

35. The carrier medium of claim 28, wherein the carrier medium comprises a transmission medium.

* * * * *